(12) United States Patent
Shafran et al.

(10) Patent No.: US 12,527,421 B2
(45) Date of Patent: Jan. 20, 2026

(54) SYSTEM AND METHOD FOR PREPARING FOOD AUTONOMOUSLY

(71) Applicant: HYPER FOOD ROBOTICS LTD., Tel Aviv (IL)

(72) Inventors: Harel David Shafran, Nir Tzvi (IL); Yariv Zvi Reches, Ramat Gan (IL); Yehuda Shamai, Tel Aviv (IL)

(73) Assignee: HYPER FOOD ROBOTICS LTD., Tel Aviv (IL)

( * ) Notice: Subject to any disclaimer, the term of this patent is extended or adjusted under 35 U.S.C. 154(b) by 629 days.

(21) Appl. No.: 17/910,016

(22) PCT Filed: Mar. 7, 2021

(86) PCT No.: PCT/IL2021/050246
§ 371 (c)(1),
(2) Date: Sep. 8, 2022

(87) PCT Pub. No.: WO2021/181377
PCT Pub. Date: Sep. 16, 2021

(65) Prior Publication Data
US 2023/0148094 A1 May 11, 2023

Related U.S. Application Data

(60) Provisional application No. 62/986,991, filed on Mar. 9, 2020.

(51) Int. Cl.
*G06Q 50/12* (2012.01)
*A47F 10/06* (2006.01)
(Continued)

(52) U.S. Cl.
CPC ............. *A47F 10/06* (2013.01); *A47J 36/32* (2013.01); *A47J 44/00* (2013.01); *B25J 11/0045* (2013.01);
(Continued)

(58) Field of Classification Search
CPC .. A47F 10/06; A47J 36/32; A47J 44/00; B25J 11/0045; B25J 11/00; G05B 19/042;
(Continued)

(56) References Cited

U.S. PATENT DOCUMENTS 4,700,617 A * 10/1987 Lee ........................ A47J 27/14
99/335
5,172,328 A * 12/1992 Cahlander ............... A47J 27/14
700/211

(Continued)

FOREIGN PATENT DOCUMENTS

| JP | 2019516358 A * | 6/2019 | ............... A21C 9/08 |
|---|---|---|---|
| WO | WO-2017134147 A1 * | 8/2017 | ............... A21B 7/00 |

*Primary Examiner* — Ashford S Hayles
(74) *Attorney, Agent, or Firm* — PEARL COHEN ZEDEK LATZER BARATZ LLP

(57) ABSTRACT

The subject matter discloses an autonomous system for preparing food products located in a housing, the system comprising multiple ingredients tanks for storing ingredients of food products and cooking equipment for preparing food products using the ingredients stored in the ingredients tanks. The system also comprises a computerized unit, that collects orders for the food products, stores operations for preparing the food products included in the orders from the ingredients and sending commands to the cooking equipment to prepare the food products included in the orders. The system also comprises a delivery preparation system for preparing the prepared food product for delivery and collection compartments for storing the prepared food products included in the orders. The collection compartments comprise an identifier accessed from outside the housing.

20 Claims, 22 Drawing Sheets

(51) Int. Cl.
*A47J 36/32* (2006.01)
*A47J 44/00* (2006.01)
*B25J 11/00* (2006.01)
*G05B 19/042* (2006.01)

(52) U.S. Cl.
CPC .......... *G05B 19/042* (2013.01); *G06Q 50/12* (2013.01); *G05B 2219/2643* (2013.01)

(58) Field of Classification Search
CPC .......... G05B 2219/2643; G06Q 50/12; G06Q 30/0633; A21B 7/00; A21B 3/07; A23L 5/10
See application file for complete search history.

(56) References Cited

U.S. PATENT DOCUMENTS

| | | | |
|---|---|---|---|
| 7,174,830 B1 | 2/2007 | Dong | |
| 9,292,889 B2* | 3/2016 | Garden | A23L 5/15 |
| 10,140,587 B2* | 11/2018 | Garden | G06Q 10/0832 |
| 10,595,660 B2* | 3/2020 | Patadia | A47J 27/04 |
| 2002/0176921 A1* | 11/2002 | Torghele | A21C 1/142 |
| | | | 426/549 |
| 2003/0037681 A1* | 2/2003 | Zhu | A47J 36/321 |
| | | | 99/468 |
| 2004/0173103 A1* | 9/2004 | Won | A47J 37/1228 |
| | | | 99/326 |
| 2005/0015256 A1* | 1/2005 | Kargman | G06Q 30/06 |
| | | | 704/272 |
| 2005/0051528 A1* | 3/2005 | Chen | A21B 3/07 |
| | | | 219/388 |
| 2005/0256774 A1* | 11/2005 | Clothier | G06Q 10/06 |
| | | | 705/15 |
| 2008/0178749 A1* | 7/2008 | Stutman | G06Q 30/0283 |
| | | | 340/286.01 |
| 2009/0281903 A1* | 11/2009 | Blatstein | G06Q 50/12 |
| | | | 705/26.1 |
| 2010/0212516 A1* | 8/2010 | Westberg | A21C 9/04 |
| | | | 99/494 |
| 2012/0185086 A1* | 7/2012 | Khatchadourian | G07F 11/70 |
| | | | 99/345 |
| 2013/0101714 A1* | 4/2013 | Buehler | A23L 5/10 |
| | | | 99/341 |
| 2014/0188637 A1* | 7/2014 | Balasubramaniam | |
| | | | G06Q 50/12 |
| | | | 705/15 |
| 2015/0019354 A1* | 1/2015 | Chan | G06Q 10/109 |
| | | | 99/325 |
| 2015/0114236 A1* | 4/2015 | Roy | A47J 44/00 |
| | | | 901/41 |
| 2015/0290795 A1* | 10/2015 | Oleynik | B25J 9/0081 |
| | | | 700/257 |
| 2016/0081515 A1* | 3/2016 | Aboujassoum | F24C 7/083 |
| | | | 434/127 |
| 2016/0235239 A1* | 8/2016 | Patadia | A47J 27/09 |
| 2016/0241415 A1* | 8/2016 | Han | G06Q 50/12 |
| 2016/0338545 A1* | 11/2016 | Shah | A47J 31/52 |
| 2017/0172350 A1 | 6/2017 | Farid et al. | |
| 2017/0290345 A1* | 10/2017 | Garden | A21C 9/08 |
| 2017/0360259 A1* | 12/2017 | Elaty | B65C 1/02 |
| 2018/0070776 A1* | 3/2018 | Ganninger | A21C 9/08 |
| 2018/0146813 A1* | 5/2018 | Wang | A47J 27/12 |
| 2018/0158153 A1* | 6/2018 | Ekin | B60P 3/0257 |
| 2018/0257219 A1* | 9/2018 | Oleynik | G05B 19/42 |
| 2018/0338504 A1* | 11/2018 | Lavri | A21C 3/02 |
| 2019/0125126 A1* | 5/2019 | Cohen | B65D 75/38 |
| 2019/0176338 A1* | 6/2019 | Zito | G06Q 50/12 |
| 2019/0276176 A1 | 9/2019 | Almogy et al. | |
| 2020/0139554 A1* | 5/2020 | Sinnet | B25J 19/02 |
| 2020/0249660 A1* | 8/2020 | Rao | G05B 19/4183 |
| 2020/0397194 A1* | 12/2020 | Goldberg | G06T 19/006 |

\* cited by examiner

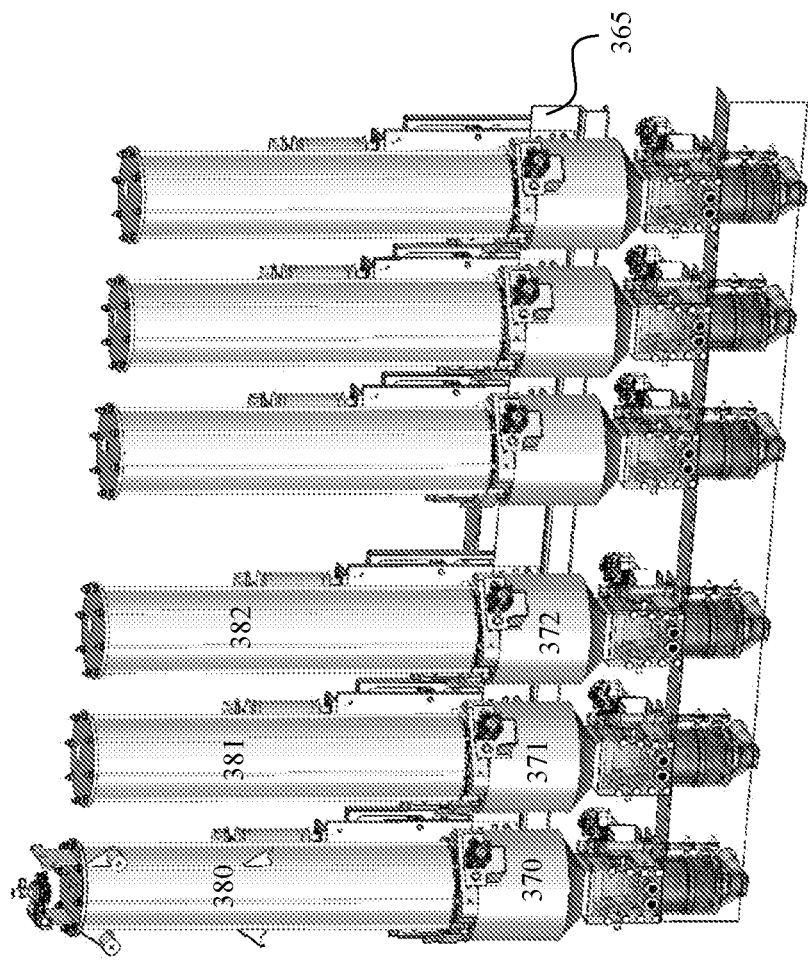

SYSTEM AND METHOD FOR PREPARING FOOD AUTONOMOUSLY

FIELD OF THE INVENTION

The present invention relates to an autonomous system for preparing food and methods for utilizing it.

BACKGROUND OF THE INVENTION

The concept of restaurants as a place for providing meals or cooked food for people has been known for centuries. Cooked food is defined as food ready to be consumed by the end user, after been fried, baked, mixed, heated, boiled, or otherwise prepared.

Restaurants provide a cultural experience, in which the customers have to go to a certain place, dress nicely, and be served by waiters. This may take more time than required by the customers, and incur additional costs, such as transportation. In addition, it is fairly expensive to operate a restaurant in a central location, in terms of rental payments, indoor design, labor costs and the like. Therefore, there is a mutual benefit for both customers and restaurant owners to transfer some of the traffic to delivery. One should remember that the restaurant's income is limited by its size, while the delivery is limited by the staff's ability to produce food, which is much higher and flexible. Staff's capacity to product cooked food has been extended in recent years through the development of ghost kitchen (also known as a delivery-only restaurant, virtual kitchen, shadow kitchen, commissary kitchen or dark kitchen), which is a professional food preparation and cooking facility set up for the preparation of delivery-only meals.

Yet, ghost kitchens require people to prepare the cooked food, which becomes a significant cost component. In addition, the kitchen's managers cannot accurately tell the exact number of cooks required each day/shift to provide the cooked food, which reduces the efficiency and profit of the ghost kitchen.

SUMMARY OF THE INVENTION

It is an object of the subject matter to disclose an autonomous system for preparing food products located in a housing, the system comprising: multiple ingredients tanks for storing ingredients of food products; cooking equipment located in a makeline area located near the multiple ingredients tanks, wherein the food products are prepared by the cooking equipment using the ingredients stored in the multiple ingredients tanks, said cooking equipment are coupled to electrical circuitry for controlling the operation of the cooking equipment; a computerized unit, comprising: a communication interface for collecting orders for the food products; memory for storing operations for preparing the food products included in the orders from the ingredients; a management system for sending commands to the cooking equipment to prepare the food products included in the orders; a delivery preparation system for preparing the prepared food product for delivery; one or more collection compartments for storing the prepared food products included in the orders after the prepared food products are prepared for delivery by the delivery preparation system; wherein each of the collection compartments comprise an identifier accessed from outside the housing; wherein each of the collection compartments stores the prepared food products included in the orders associated with a person collecting the orders.

In some cases, the communication interface receives an identifier identifying the orders received from a delivery server, wherein the identifier is used to verify that an authorized person collects the prepared food products. In some cases, each of the one or more collection compartments has a lock state and an unlock state, wherein the collection compartments move to unlock state upon identifying an authorized person collecting the prepared food products. In some cases, the system further comprises an identifying module coupled to the one or more collection compartments, the identifying module receives a signal to identify the authorized person collecting the prepared food items from the collection compartments.

In some cases, the communication interface sends details of the order only after the collection compartments that stored the prepared food products of the order collected by the person are empty. In some cases, the delivery preparation system comprises a packing arm coupled to the management system, said packing arm is configured to pack the prepared food products; a stack of boxes from which the packing arm extracts a box to pack the prepared food products. In some cases, the system further comprises a conveyor for conveying the packed food products from the packing arm to the collection compartments. In some cases, the packing arm is configured to pack multiple food products in the same box.

In some cases, the system further comprising an actuator sensor for detecting the actuator's movement and send signals representing the actuator's movement to the management system.

In some cases, the system further comprising an actuator for moving at least one ingredients tank from the multiple ingredients tanks towards the makeline area. In some cases, the cooking equipment comprises multiple cooking equipment in the makeline area, the management system determines which food product is prepared by each cooking equipment of the multiple cooking equipment, wherein the actuator moves a ingredients tank storing the ingredients required to prepare the food product in the received order to the cooking equipment selected by the management system. In some cases, each cooking equipment of the multiple cooking equipment comprises a conveyor and a heating unit located above the conveyor for heating the food products.

In some cases, the system further comprising an inventory sensor for detecting inventory status of the multiple ingredients tanks. In some cases, the housing comprises a base, ceiling and sidewalls, at least one of which comprises insulating materials embedded therein. In some cases, the housing has an aperture for connecting the system to infrastructure. In some cases, the housing comprises a loading area, said loading area comprising a loading aperture used to load ingredients into the multiple ingredients tanks.

In some cases, the system further comprising sterilization devices for sterilizing the new ingredients tanks loaded into the system. In some cases, the management system receives an indication when ingredients are loaded into the ingredients tanks, said indication comprises an identifier of the ingredient and an identifier of the ingredients tank. In some cases, the system further comprising a cold dish storage for storing beverages and cold dishes, said cold dish storage is coupled to the collection compartment, such that the beverages and cold dishes move from the cold dish storage to the collection compartment based on the received order. In some cases, at least one of the multiple ingredients tanks move towards the cooking equipment in response to a command from the management system.

In some cases, the multiple ingredients tanks are arranged in two separate arrays of ingredients tanks, wherein the first array of ingredients tanks comprise cabinets storing ingredients required to be extracted by entering the cabinets, and wherein the second array of ingredients tanks comprises cartridges. In some cases, the first array of ingredients tanks comprises an upper section of cabinets and a lower section of cabinets, each of the upper section of cabinets and a lower section of cabinets move independent relative to the other section. In some cases, the system further comprising a makeline bar for carrying cartridges of the second array of ingredients tanks used to prepare the food products of the order and a waiting bar for carrying cartridges of the second array of ingredients tanks not used to prepare the food products of the order. In some cases, moving cartridges from the waiting bar to the makeline bar is done based on the ingredients needed to prepare the food products of the order. In some cases, moving a cartridge from the waiting bar to the makeline bar is done while other cartridges dispense ingredients to prepare the food products of the order.

In some cases, the multiple ingredients tanks, the cooking equipment and the delivery preparation system are coupled to components' controllers, wherein the components' controllers control the operation of the multiple ingredients tanks, the cooking equipment and the delivery preparation system to execute the commands received from the management system. In some cases, the components' controllers generate commands sent to the multiple ingredients tanks and to the cooking equipment in response to a new order received at the management system prior to receiving commands from the management module.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 3A-3D show a second array of movable cartridges that output the ingredients independently, according to exemplary embodiments of the present invention;

DETAILED DESCRIPTION OF THE INVENTION

Figure 1A:
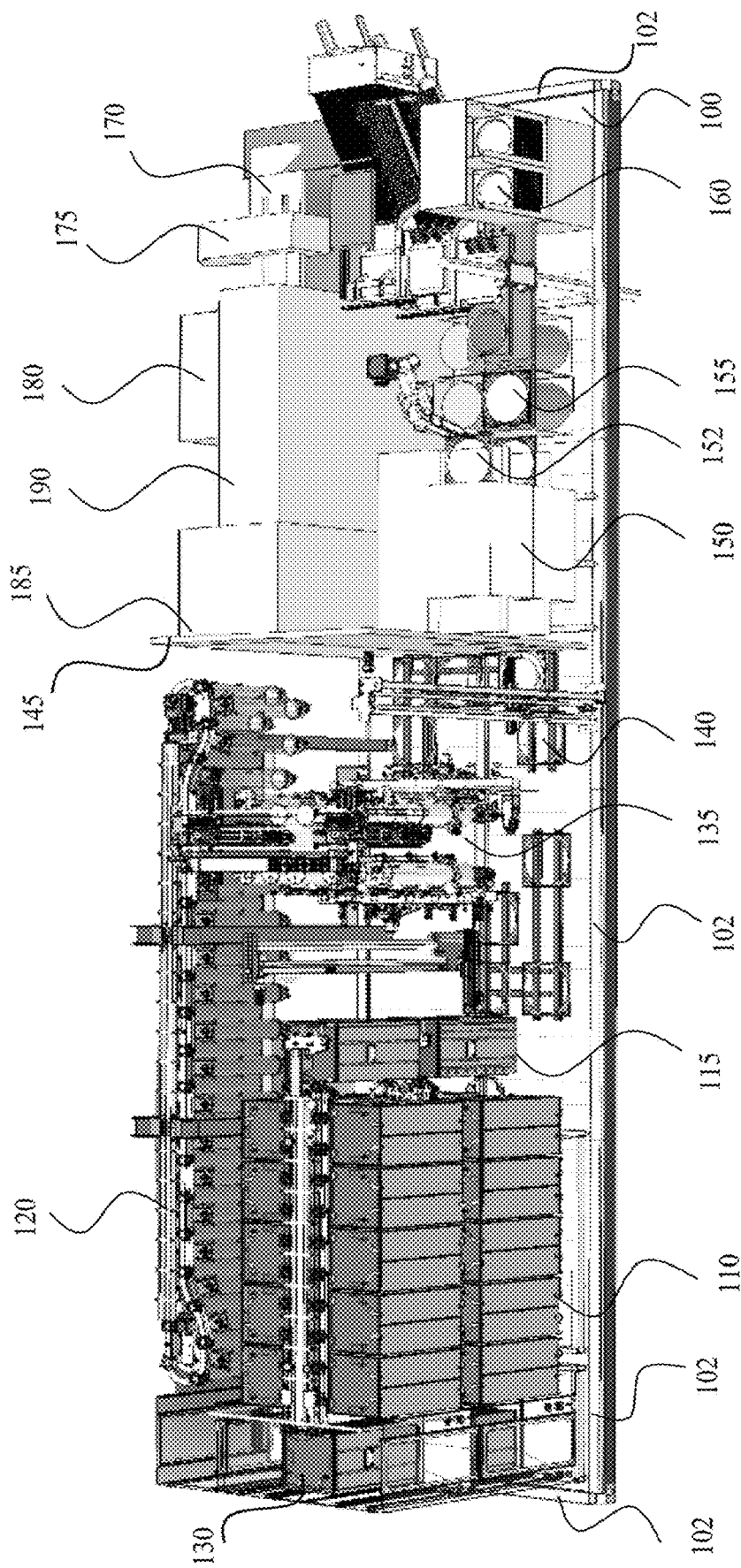
FIGS. 1A-1B show perspective view of an autonomous system for preparing a food item, according to exemplary embodiments of the present invention.

The subject matter discloses an autonomous system for preparing cooked food products. The system produces the cooked food items, also defined herein as food products. The system comprises ingredients tanks that contain the ingredients of the food products, heating and cooking equipment for preparing the food items from the ingredients, a computerized unit for controlling the cooking and delivering process, and robotic units for moving items in the system from one place to another. The ingredients tanks may move based on the system's requirements, for example towards the heating/cooking units. In some other cases, the ingredients tanks may remain in place during cooking and robotic arms may move towards the ingredients tanks to extract or collect the ingredients. The ingredients tanks may include cartridges that have an opening from which the ingredients are dispensed upon command. The ingredients tanks may include cabinets storing other ingredients.

The autonomous system of the subject matter may also comprise a delivery preparation system for preparing the prepared food product for delivery. The delivery preparation system receives the food product after preparation by the cooking equipment, and prepares the food products, before sending the food products to the collection compartments. For example, the delivery preparation system comprises a packing arm for packing the prepared food products. The delivery preparation system may also include a knife for cutting the prepared food products, for example slicing a pizza. The delivery preparation system may also comprise a bundling arm for packing multiple food products in the same package. The delivery preparation system may also comprise quality control sensors, such as image capturing devices for capturing images of the food products to verify that the food products were prepared properly, metal sensors and the like.

The system is designed to be placed as an entire store, executing the entire supply chain of a restaurant in an autonomous manner, from receiving the order, cooking the food items included in the order and providing the order to a customer or to a delivery person. The system comprises a housing, for example in the shape of a cube or a box. The housing comprises a base, functioning as a floor, sidewalls, and a ceiling. The housing comprises a passage for coupling the system's components with infrastructure, such as electrical grid, water, drainage, communication network and the like. The housing also comprises an input opening in which the ingredients are provided into the ingredients tanks. The housing also comprises a collection opening, in which the customer or delivery person collect the food items.

The term "autonomous" is defined in the subject matter as self-governing, that does not require persons to operate. This is different from automated, which performs a process, but still requires persons to operate it.

The term "cooked food product" may be pizza, salads, hamburgers, deserts, pastries, rice-based dishes, appetizers, pasta dishes, chicken dishes, vegetarian dishes, beef-based dishes, pork-based dishes and the like. The autonomous system cooks the cooked food from ingredients of the food items, the ingredients are stored in the system's ingredients tanks in a cooled state, not in a freeze state, in a temperature range of 2-10 degrees Celsius, more specifically about 4 degrees Celsius.

Figure 1B:
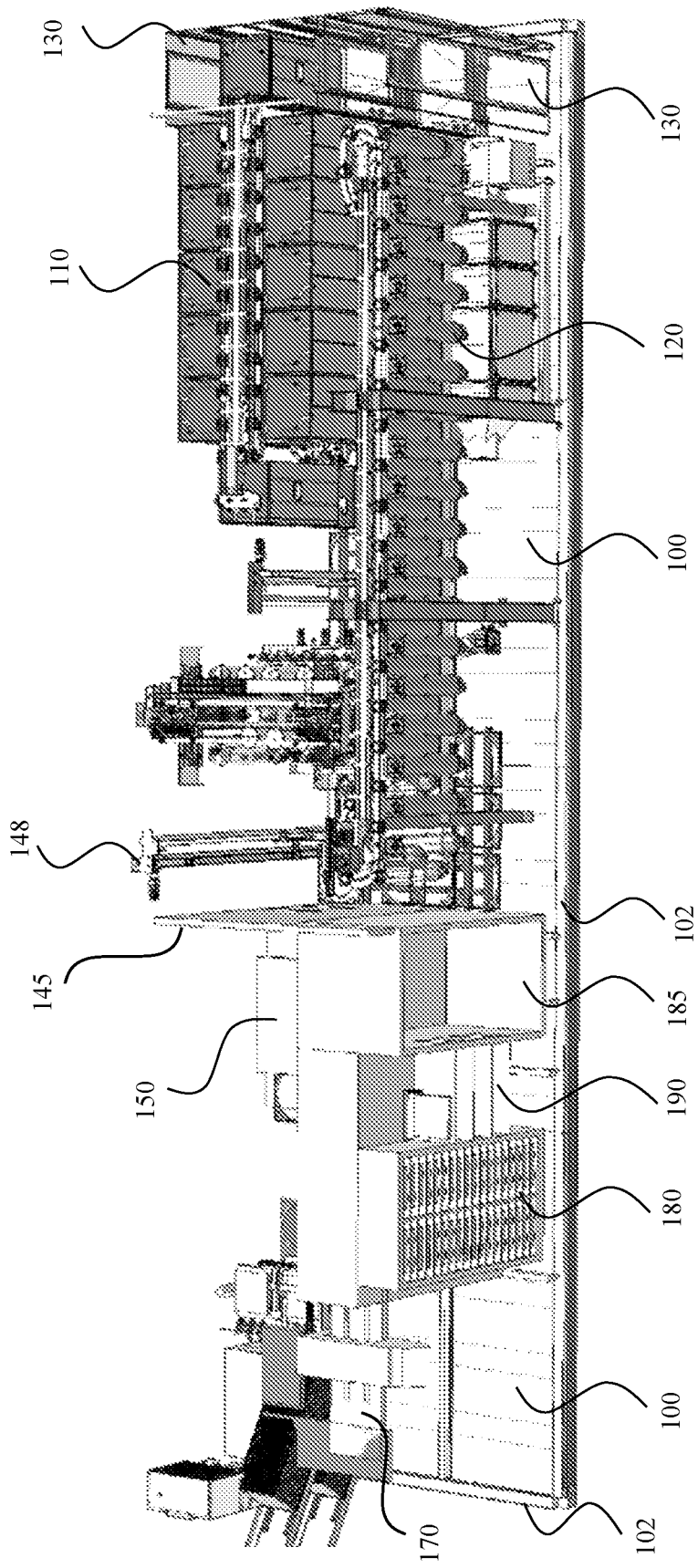

FIGS. 1A-1B show perspective view of an autonomous system for preparing a food item, according to exemplary embodiments of the present invention.

The perspective view does not show the sidewalls and ceiling of the housing, only the floor 100. The edges 102 of the floor 100 define the walls from which the sidewalls extend upwards. The volume defined inside the housing is divided into at least two (2) sub-areas defined by a wall 145 or another barrier that prevents passage of cold air from the cooled sub-area to the non-cooled area. The cooled area comprises the first array of ingredients tanks 110 and the second array of ingredients tanks 120, both contain the ingredients used to cook the cooked food product, or dishes, per the orders received in the system. The first array of ingredients tanks 110 may be implemented in the form of cabinets having doors. When wishing to use the ingredients from the cabinets 110, the relevant cabinet is moved towards the makeline 135. The cooled area may also include the makeline 135, which is where the food product is assembled from the ingredients. In some other cases, the makeline 135 is located in the non-cooled area. The cooled area also comprises the loading area 130. The loading area may span in one of the ends of the housing, to enable filling the ingredients tanks in a minimal invasive manner, for example by opening a door or a window in the housing sidewall, and accessing the ingredients tanks to be filled.

The loading process is performed by a person delivering the ingredients to the autonomous system. The supplying person then opens the input aperture in one of the sidewalls of the system's housing. In some exemplary cases, each of the arrays of ingredients tanks 110, 120 have at least one ingredients tanks accessed from the loading area 130. So, the supplying person fills the cabinet or cartridge accessed to him/her, or replaces a cartridge. In some exemplary cases, the loading area 130 is equipped with cleaning or sterilization devices for sterilizing the new ingredients tanks loaded into the system. The cleaning or sterilization devices may dispense pressurized gas or a cleaning fluid on the loaded ingredients tanks.

After the first ingredients tank is full, the array of ingredients tanks moves in order to place another ingredients tank in a position accessed from the loading area 130. In some cases, there is one cabinet and one cartridge always present in the loading area 130. The computerized unit governing the operation of the autonomous system receives an indication as to the ingredients inputted into the ingredients tanks. Such information may be inputted by the supplying person into an electronic device. In other cases. The ingredients are secured to a plate having an RFID tag that identifies the type of ingredient just inserted into an ingredients tank, or to a specific shelf in a cabinet, as in the first array of ingredients tanks 110. In the second array of ingredients tanks 120, the indication may be provided by a weight sensor detecting the weight on each cartridge and communicating with the computerized unit.

The makeline 135 comprises one or more moving arms and conveyors for preparing the food product. For example, in case the food product is a pizza plate, the arms extract the pizza dough from a specific cabinet of the first array of ingredients tanks 110, and moves the dough under relevant cartridges in the second array of ingredients tanks 120, to spread sauces and add toppings. The arms of the makeline 135, and the arrangement of the cartridges in the second array of ingredients tanks 120, enable to pour sauce, cheese and toppings on multiple doughs concurrently. After the dough is covered with toppings and sauces according to the order, the arm moves the dough to a pre-oven area 140, coupled to a conveyer. The conveyor moves the dough to an oven 150.

In some cases, an oven lift 148 is used to raise the dough from the conveyer to the height of the oven 150. The oven is located in the non-cooled area, in the other side of the wall 145. The oven may be a conveyer oven, moving the cooked pizza to a resting area 152. During the entire process of storing the dough, adding the sauce and toppings, and baking the pizza, the dough is located under a plate. After cooked in the oven 150, a packing arm removes the pizza from the plate and places the pizza on a box in a packaging area 155. The plate is moved by the packing arm to a stack of plates 160. The cooked pizza is cut into slices and covered by the box by the packing arm. The packing arm then moves the box with the cooked pizza on a collection conveyor 170 that conveys the box towards the collection compartment 190 where the box is to be collected.

The pizza may be conveyed on the collection conveyor 170 through a sensor 175 to verify the pizza's quality, such as a metal sensor configured to verify that the pizza lacks metallic materials.

The pizza is then conveyed to a heated area 180 where the pizza is stored before collection. The heated area may be heated to a temperature of 50-80 degrees Celsius [Please provide the relevant range]. The system also comprises a cold dish storage 185 for storing cooled dishes, such as beverages, deserts, salads and the like. The cold dish storage 185 may store the cooled items in a temperature range of 4-10 degrees Celsius. The autonomous system also comprises collection compartments 190 enabling a person to collect the food products from outside the housing. The collection compartments 190 may have two lateral passageways—one for conveying hot food products from the heated area 180 and the other for conveying cooled items from the cold dish storage 185. The collection compartments 190 also comprises an external passageway, directed outside of the housing, enabling a person to remove the food items from the collection compartments 190.

Figure 2A:
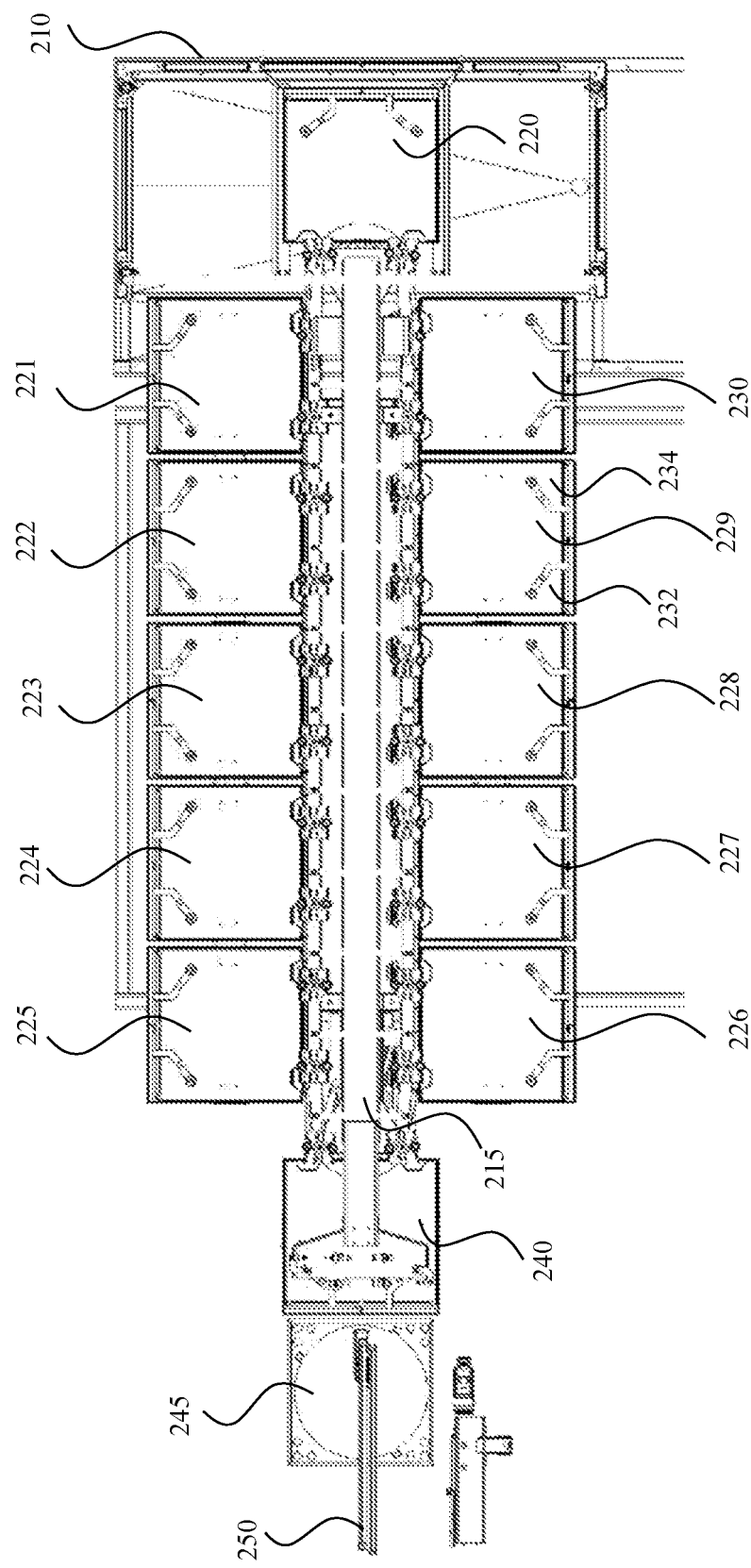
FIGS. 2A-2C show a first array of movable cabinets and a fetching mechanism for extracting the ingredients from the cabinets, according to exemplary embodiments of the present invention.
Figure 2B:
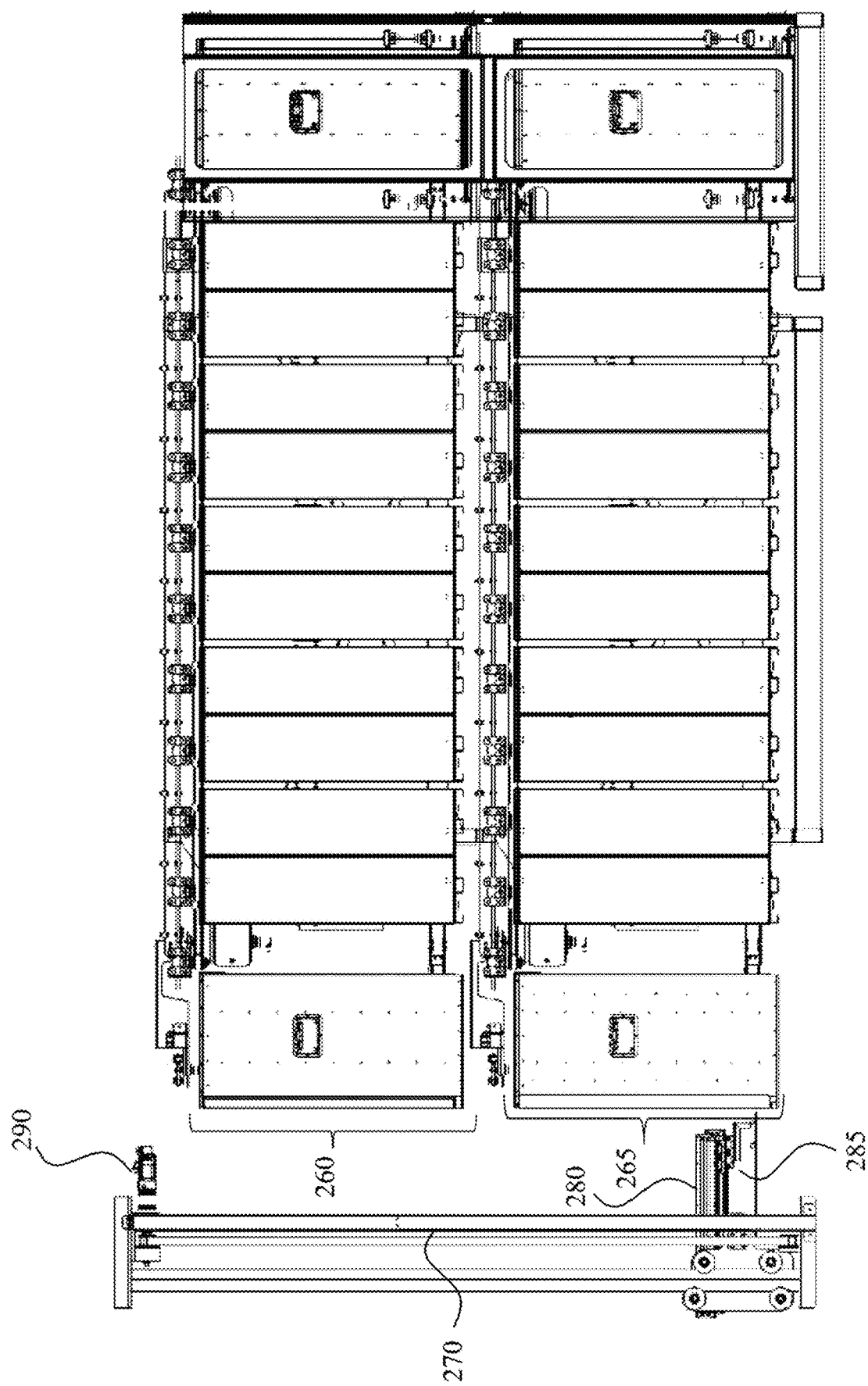
Figure 2C:
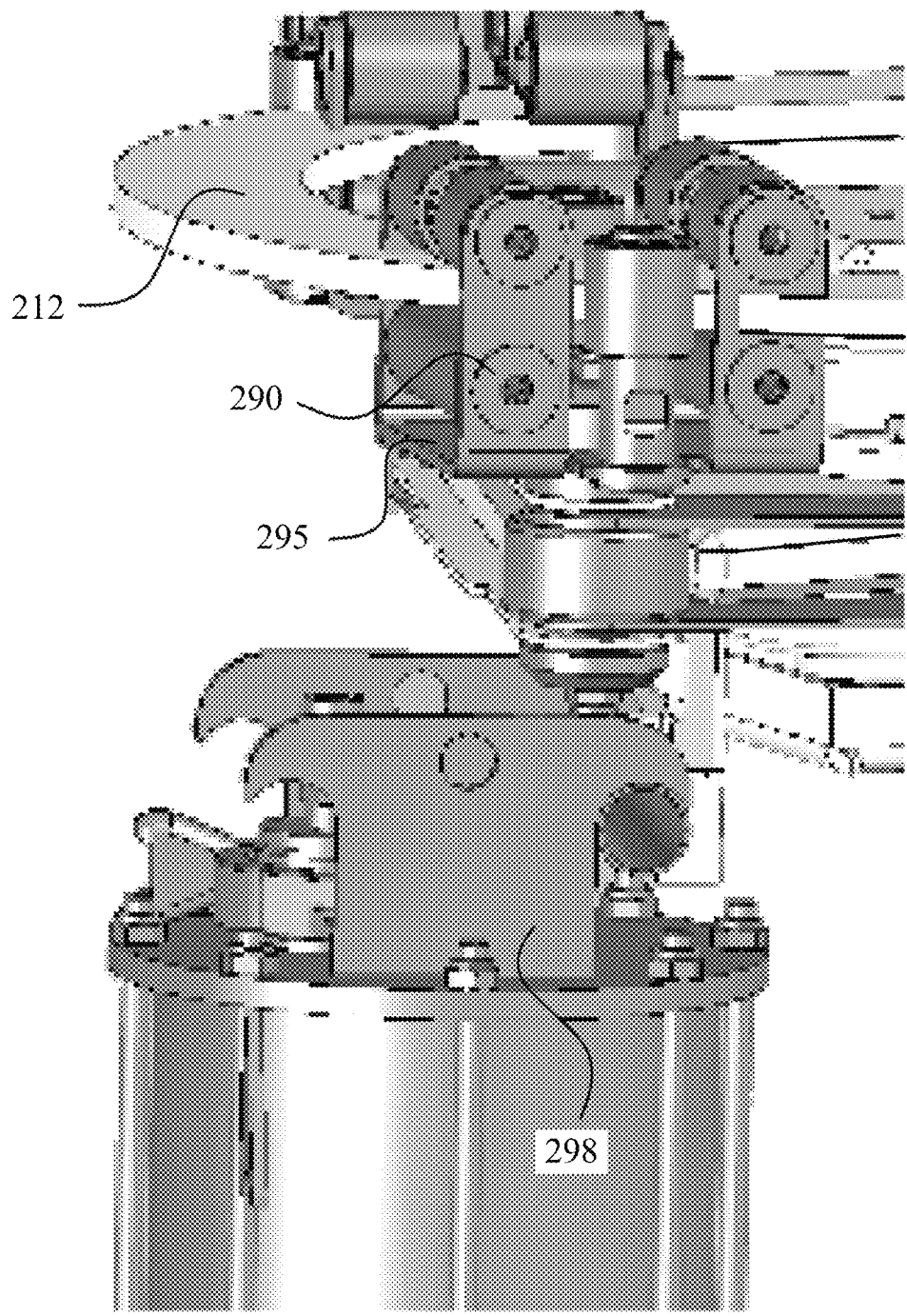

FIGS. 2A-2C show a first array of movable cabinets and a fetching mechanism for extracting the ingredients from the ingredients tanks, according to exemplary embodiments of the present invention. The first array of ingredients tanks includes cabinets that store ingredients required to be extracted from the ingredients tanks. The ingredients stored in the first array of ingredients tanks may be the base of the food product, for example a bun of a hamburger, dough of a pizza, a sheet of seaweed (Nuri) and the like.

The ingredients in the first array of ingredients tanks may be stacked one on top of the other. In other cases, the cabinets of the first array of ingredients tanks comprise shelves enabling the supplying person to place the ingredients on the shelves, for example using plates or trays.

FIG. 2A shows a top view of the first array of ingredients tanks, showing cabinets 220, 221, 222, 223, 224, 225, 226, 227, 228, 229, 230. The cabinets in the first array of movable ingredients tanks are connected to a main bar 215 located on the system's base 100. The cabinets 220-230 are connected to the main bar 215 via connectors that enable the cabinets 220-230 to move in a linear manner along the circumference of the main bar 215, for example from the loading area 210 towards the makeline area. In FIG. 2A, cabinets 220 is located in the loading area 210 and cabinets 240 is located in the makeline. The loading area 210 has a loading opening enabling a person to load ingredients into the cabinets located in the loading area 210. In some cases, the loading area may enable loading ingredients into multiple cabinets concurrently.

The cabinets 220-230 and 240 move along the main bar 215 according to commands received from the computerized unit governing the operation of the autonomous system. The command may be "bring cabinets #4 to the makeline and all the cabinets 220-230 and 240 move along the main bar 215 until cabinets #4 is closer to the extractor 285. The extractor 285 extracts the ingredients from the cabinets #4, for example from tray #17, as the computerized unit stores data indicating that tray #17 stores the ingredient necessary to prepare the food item in an order.

The cabinets 220-230 and 240 may have a constant opening, allowing immediate access to the ingredients. In some other cases, the cabinets 220-230 and 240 may comprises one or more doors 232, 234 for protecting the ingredients. The doors 232, 234 may be opened automatically when the cabinets reach the makeline area, or opened by a mechanism such as the extractor 285.

The first array of ingredients tanks comprises an actuator for moving the cabinets 220-230, 240. The actuator may be coupled to a single point in a cable moving the cabinets 220-230, 240. The cable may be coupled to the main rod 215. In some other cases, the system may comprise a separate actuator for each cabinet, or to a sub-group of cabinets.

FIG. 2B shows a side view of the first array of ingredients tanks having cabinets, as well as the extractor unit that extracts the ingredients from the cabinets. When a command is received to extract an ingredient from the first array of ingredients tanks, the controller operating the array first moves the relevant cabinet to the makeline area 240. Then, the extractor 285 is raised over a lift bar 270 to the desired height. The desired height may be the height of the tray storing the desired ingredient. The height, or an identifier of the tray/shelf, is included in the command for extracting the specific ingredient. The lift bar 270 is located on the base 100 of the system, preferably coupled to the base 100 via a lift base 280. The lift bar 270 is coupled to a lift actuator 290 that moves the extractor 285 along the lift bar 270.

The extractor 285 places the extracted ingredient in a specific location, such as ingredient basis 245. The size and shape of the ingredient basis 245 may fit the size of the ingredient, such as a bun, slice of meat, pizza dough and the like. The ingredient basis 245 may be coupled to a makeline conveyor 250 that conveys the ingredient to the makeline area. The extractor 285 may comprise one or more movable teeth that secure the plate on which the pizza dough is mounted. In another case, the extractor 285 may comprise a surface in a size that enables to place the plate on top of the surface.

FIG. 2B also shows two sections of cabinets, upper section 260 and lower section 265. Cabinets in each of the sections 260, 265 moves around the main bar 215. Cabinets in one of the sections 260, 265 can move, while cabinets in the other sections remain still. This enables to load cabinets in one of the sections, during operation of the system. For example, the cabinets in the upper section 260 are loaded with ingredients, while the cabinets in the lower section 265 are used to cook the food items and the extractor extracts the ingredients only from the cabinets in the lower section 265 until loading of the cabinets in the upper section 260 ends.

FIG. 2C shows a cabinet connecting mechanism to couple the cabinets 220-230 to the main bar 215. The frame 212 surrounds the main bar 215, spanning parallel to the base 100 of the autonomous system, such that the cabinets move on the horizontal plane. The cabinets 220-230 comprise a grip 298 that can be hanged on the mechanism. The grid 298 may be placed in an upper part of the cabinets 220-230. The cabinet connectors 295 slide on the frame 212 to move the cabinets 220-230, for example towards the makeline area and the loading area 210. The cabinet connectors 295 may be shaped to connect with the grip 298, for example using a niche, a hook, a protuberance, bump and the like.

The cabinet connectors 295 may comprise wheels 290 rolling on the frame 212. The wheels may move in response to a command from a processor located in the second array of ingredients tanks, for example a processor coupled to each cabinet. In some exemplary embodiments, one cabinet connector 295 may be coupled to one cabinet, or to multiple cabinets.

FIGS. 3A-3D show a second array of movable ingredients tanks that output the ingredients independently, according to exemplary embodiments of the present invention.

The ingredients tanks in the second array may be formed as cartridges that output the ingredients via an aperture, for example an aperture located in the bottom of the ingredients tanks. The ingredients in the cartridges of the second array may be poured in small and controlled portions, for example as liquid, paste, powder, very small pieces (not more than 20 grams per piece) and the like.

In standard mode of operation, at least one of the cartridges in the second array are located in the loading area 305, even if none of the cartridges is loaded at a given time. The second array of ingredients tanks has cartridges in a waiting area and cartridges in the makeline area. Only cartridges in the makeline area can be used to prepare a food product. When there is need for ingredients stored in a specific cartridge currently placed in the waiting area, the system moves the specific cartridges to the makeline area. The cartridges in the makeline area dispense their content in an amount dictated by the computerized unit, according to a set of rules stored in the computerized unit. The cartridges comprise an aperture via which the ingredients are dispensed or poured. The aperture is opened in order to begin dispensing and closed to end dispensing. The aperture may be opened and closed based on commands received from a processor coupled to the cartridges. The dispensing timing may be determined by one or more sensors or controllers 360 located in the makeline area, for example based on movement of robotic arms that maneuver a plate under the cartridges in the makeline area.

The cartridges in the waiting area are coupled to a waiting main bar 315 in a manner that enables the cartridges to move around the waiting main bar 315, for example towards the loading area 305 and towards the makeline bars 330, 335 in the makeline area. The waiting main bar 315 may be coupled to the base 100 of the system housing using waiting bar bases 310, 312 secured to the base 100. The cartridges in the waiting area may be located on both sides of the waiting main bar 315. The waiting main bar 315 may be of an elongated shape, as one end of the longitudinal axis of the waiting main bar 315 has the loading area 305. The cartridges may be placed on both sides of the longitudinal axis. For example, cartridges 322, 323 are located in the rear side, closer to the system's sidewalls, while cartridges 320, 321 are located in the front side, closer to the makeline area. The cartridges in the waiting area move together, either clockwise or counter clockwise, surrounding the waiting main bar 315. The cartridges may be removed from the waiting main bar 315 when loaded, replaced or when need to be repaired.

The makeline area comprises one or more makeline bars 330, 335 carrying the cartridges when dispensing the ingredients to prepare the food product. For example, cartridges 340 and 341 are coupled to makeline bar 335 and cartridges 342 and 343 are coupled to makeline bar 330.

The second array of ingredients tanks move using an actuator 350. The actuator may be coupled to a chain connected to all the ingredients tanks in the waiting area. In such exemplary embodiment, when moving a ingredients tanks from the waiting area to the makeline area, the ingredients tanks is released from the chain and hang on a chain coupled to one of the makeline bars 330, 335.

Figure 3A:
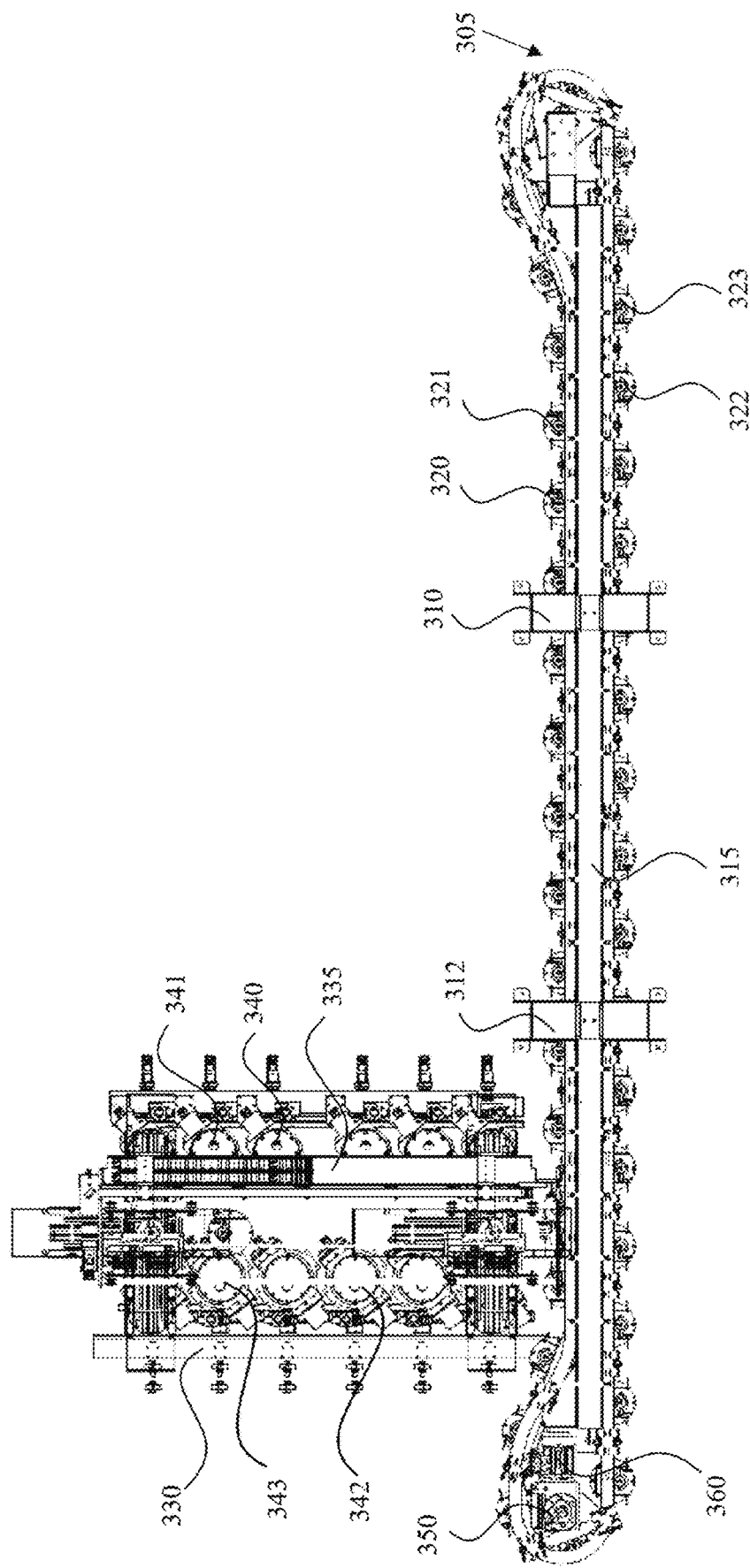
Figure 3B:
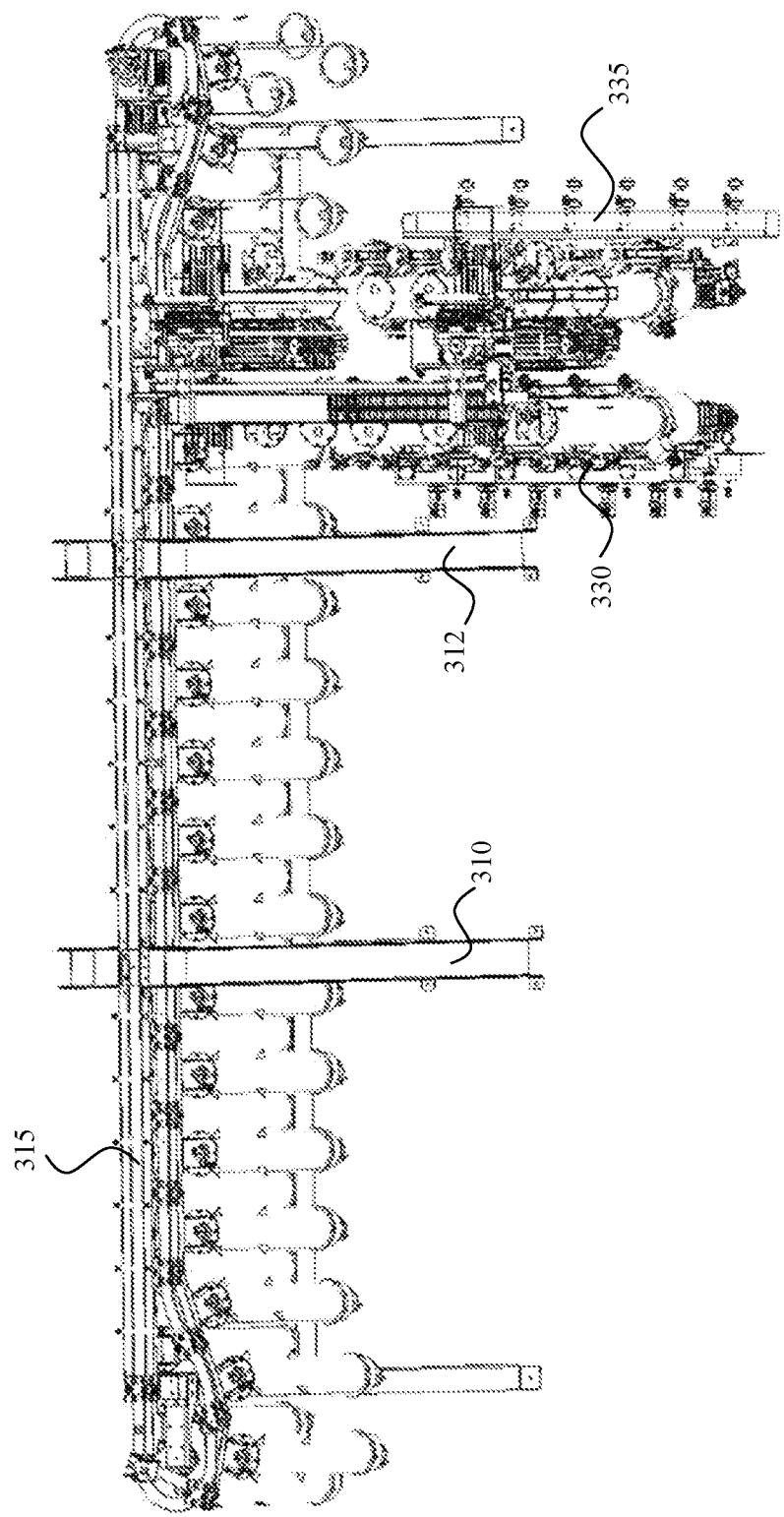
Figure 3C:
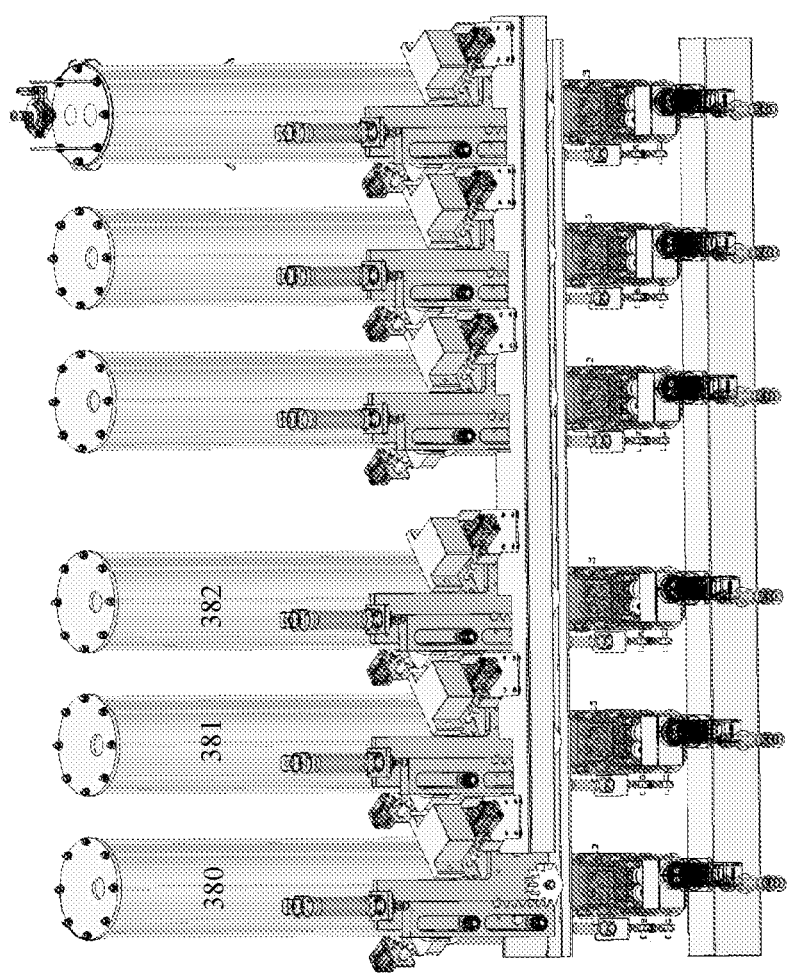

FIGS. 3C-3D show the cartridges mounted in the makeline bar, according to exemplary embodiments of the present invention. The makeline bar 365 is coupled to cartridge houses 370, 371, 372. Each of the cartridge houses 370, 371, 372 is configured to carry a cartridge. For example, the cartridge houses 370, 371, 372 may have an upper opening via which the cartridges are slid thereto. For example, cartridge house 370 carries cartridge 380, cartridge house 371 carries cartridge 381 and cartridge house 372 carries cartridge 382. The cartridge selected to be located in the makeline bar 365 travels from the waiting area over a connection bar to the selected cartridge house, for example based on a command sent from the computerized unit. The connection bar spans along the length of the makeline bar, and is coupled to the waiting main 315.

Figure 4A:
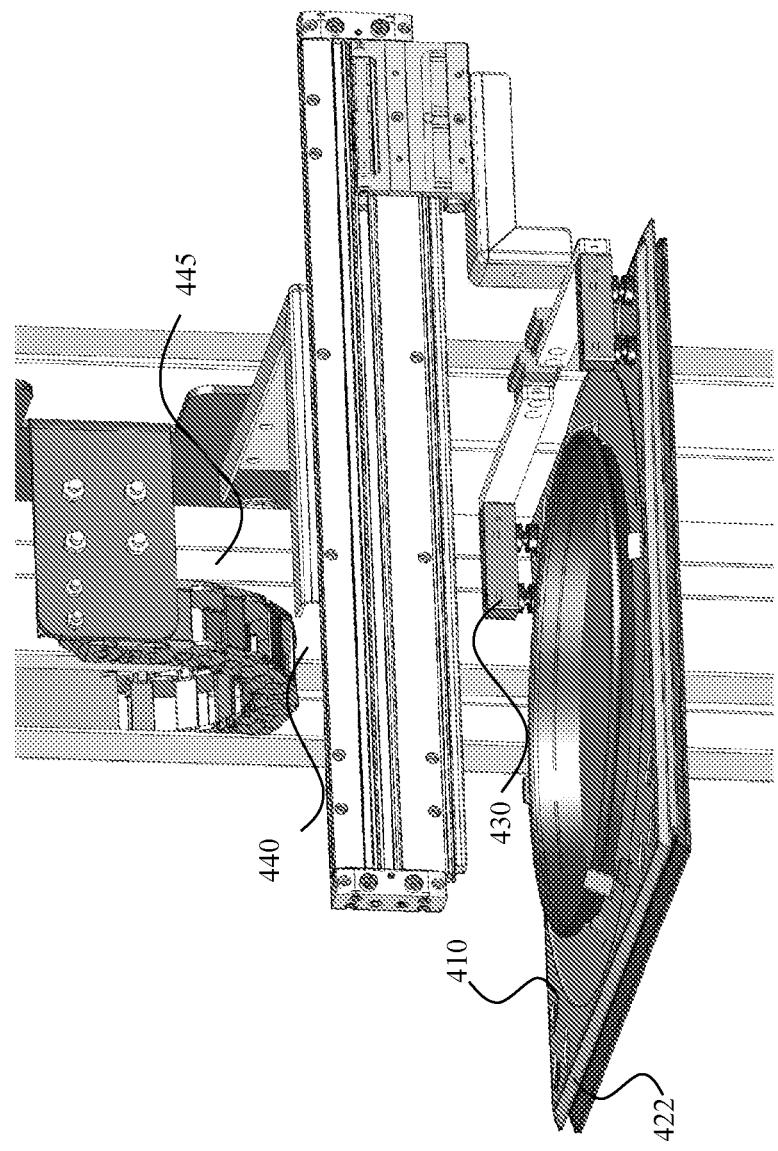
FIGS. 4A-4B show a plate holding an ingredient moved to an oven, according to exemplary embodiments of the present invention.
Figure 4B:
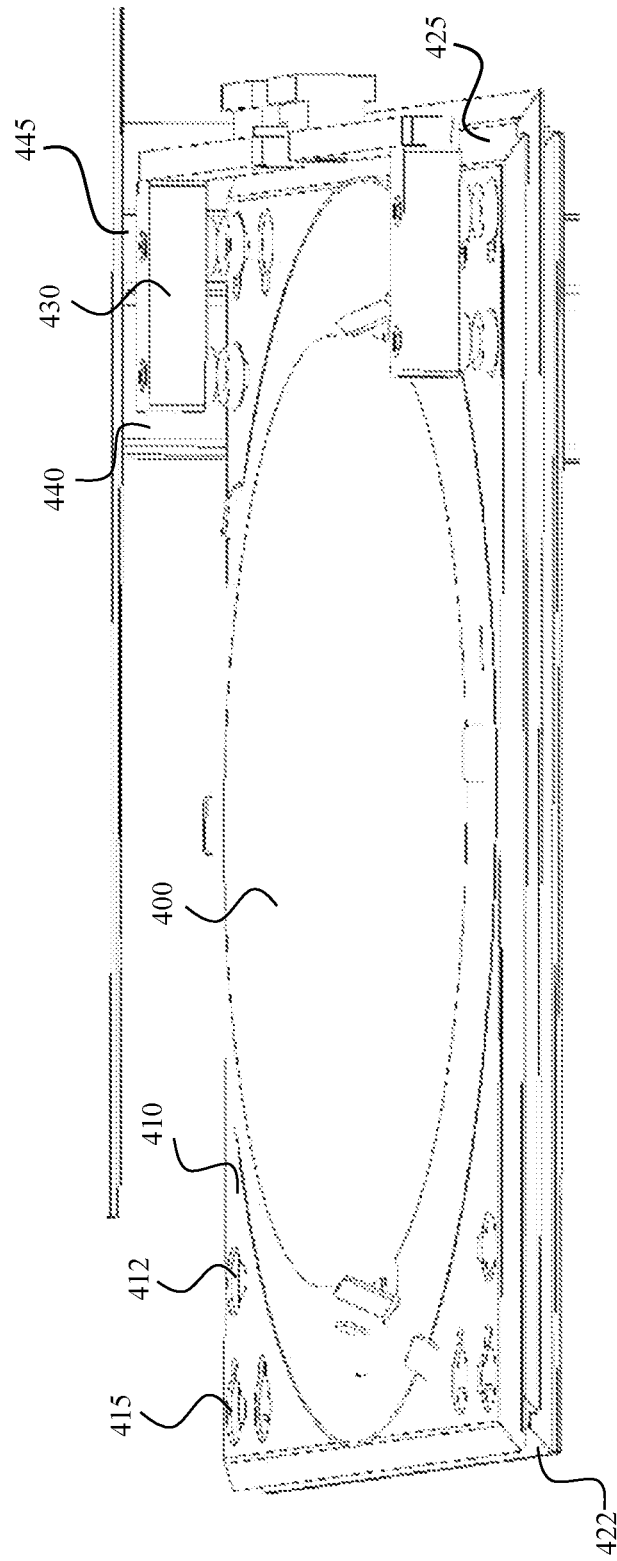

FIGS. 4A-4B show a plate holding an ingredient moved to an oven, according to exemplary embodiments of the present invention. The ingredients may be collected from cabinets in the first array of ingredients tanks, cartridges in the second array of ingredients tanks, or both. The ingredients may be mixed before moved to the oven. After collecting the ingredients on a plate, the tray 410 is moved by robotic arms close to a lift 422. The lift 422 raises the tray 410 with the ingredients to a height of the oven. The lift 422 is coupled to a lift pole 440 holding the lift. The lift pole 440 is perpendicular to the base 100 of the housing. The lift pole 440 may have a protrusion 445 extending towards the plate lift 422, enabling brackets 430 of the lift to lock around the protrusion 445.

The tray 410 comprises a niche 400 for storing a plate 400. The plate keeps the ingredients from the oven's base while heating the ingredients. The tray 410 comprises one or more apertures 412, 415 enabling the extractor to secure its grasp on the tray 410 when extracting the tray from the cabinets of the first array. The apertures 412, 415 may be located on four corners of the tray 410. The apertures 412, 415 may be of a shape having a wide part and a narrow part, such that the grasping members are inserted via the wide part and rotate so they cannot retract via the apertures 412, 415.

Figure 5B:
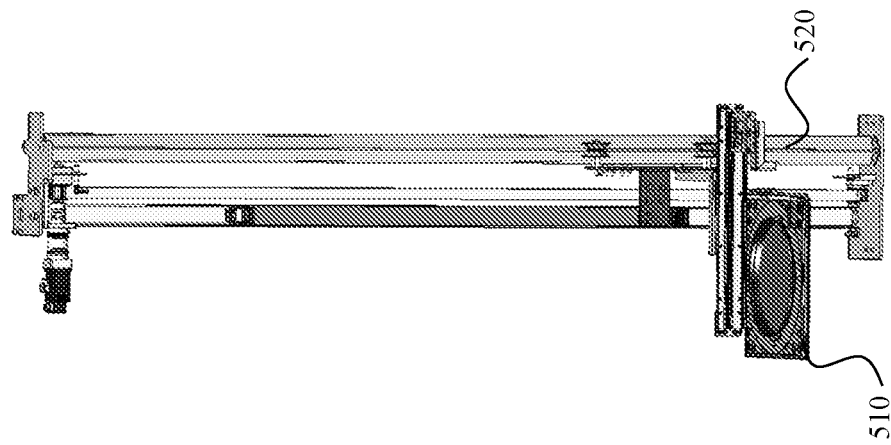
FIGS. 5A-5B show an array of ovens and a lift for raising a plate with ingredients to the ovens' height, according to exemplary embodiments of the present invention.
Figure 5A:
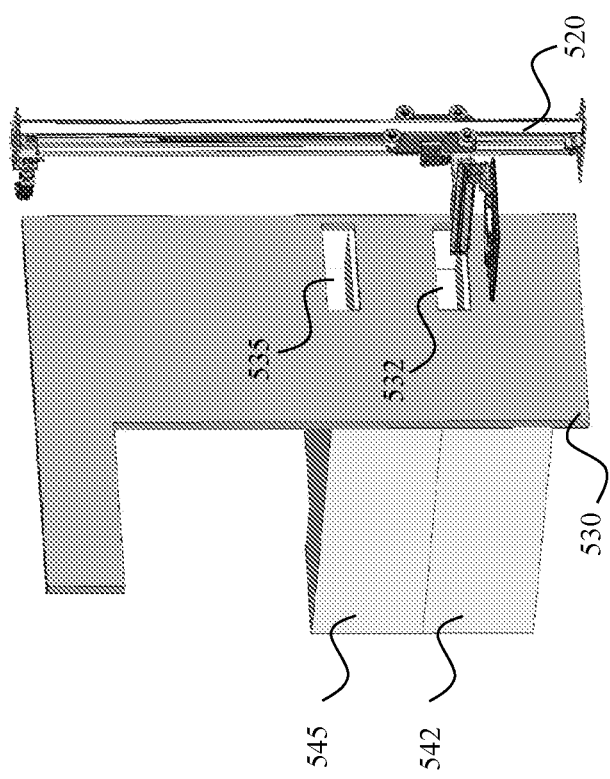

FIGS. 5A-5B show an array of ovens and a lift for raising a plate with ingredients to the ovens' height, according to exemplary embodiments of the present invention. Once the ingredients are ready to be cooked, heated, fried and the like, they are conveyed to the preparation unit. The preparation unit may be a grill, an oven, a frying unit, steamer and the like. In the exemplary case below, the preparation unit is an oven. The system may comprise multiple preparation units, for example multiple ovens 542, 545. The ovens 542, 545 of the exemplary case are placed one on top of the other. The ovens 542, 545 may be conveyer ovens, receiving the plate with the ingredients in an oven opening such as opening 532 and 535 and output a prepared food product in oven output. The oven openings 532 and 535 may be holes in the barrier 530 that separates between the cooled area and the non-cooled area.

The tray base 510 of the oven lift grasps the tray and moves upwards along the oven lift pole 520. The oven lift is coupled to an actuator that moves the tray base 510. The actuator is coupled to a power source such as the electrical grid.

Figure 6A:
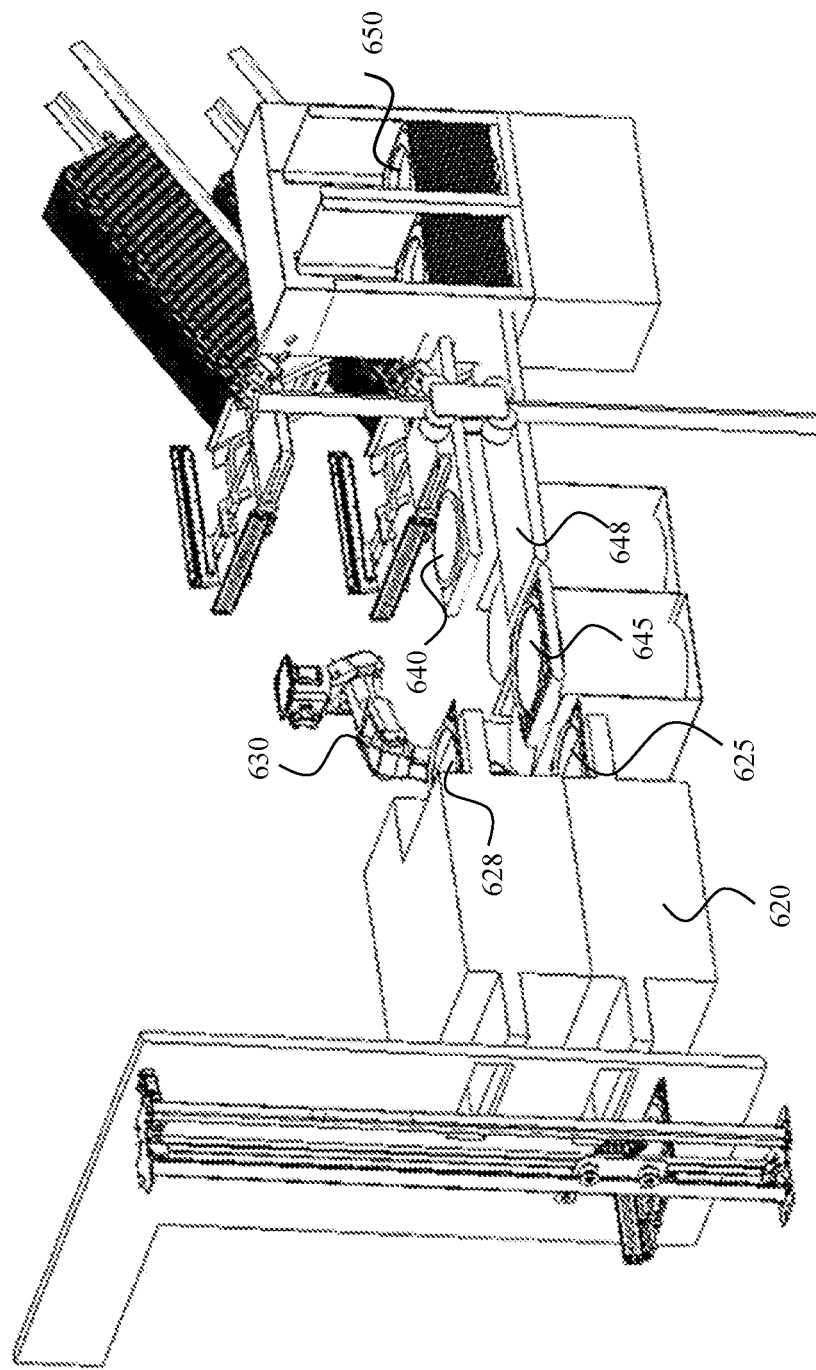
FIGS. 6A-6B show a non-cooled area and components for handling a food product after heated by the oven, according to exemplary embodiments of the present invention.
Figure 6B:
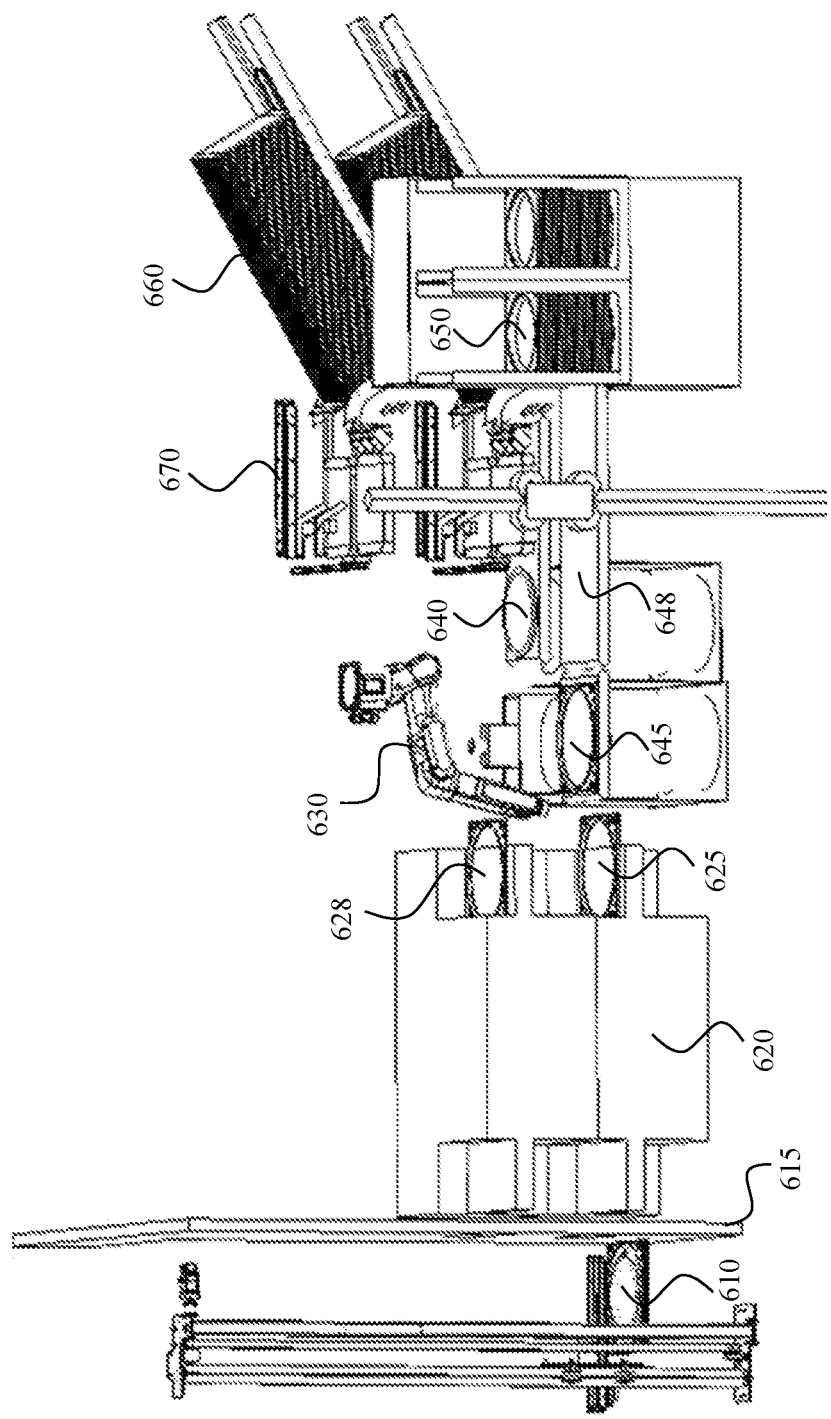

FIGS. 6A-6B show a non-cooled area and components for handling a food product after heated by the oven, according to exemplary embodiments of the present invention. After the ingredients are arranged on a plate, they are delivered to a pre-oven station 610 where they are carried by the oven lift to the oven 620. The oven 620 opening may be in the barrier 615 as mentioned above. After the food product is cooked by the oven 620, the cooked food product arrives at the cooked dish station 625, 628, depending on the oven that cooked the food product. A packing arm 630 moves the food product from the cooked dish station 625 to the packing station 640, after removing the tray 645 from under the cooked food product. The tray 645 is placed on a tray conveyor 648 that conveys the tray 645 to a tray stack 650. The trays in the tray stack can self-clean or wait for the loading person to remove them from the system. The packing arm 630 takes a box from a stack of boxes 660 to the packing station 640, places the cooked food product on the box and covers the cooked food product with the box. Then, the packing arm 630 places the box with the cooked food product on a collection conveyor 670 that conveys the cooked food product to the collection compartment where the food product is collected. In some cases, the packing arm 630 places the packed food product on a collection lift that raises the packed food product to the collection conveyor 670.

Figure 7A:
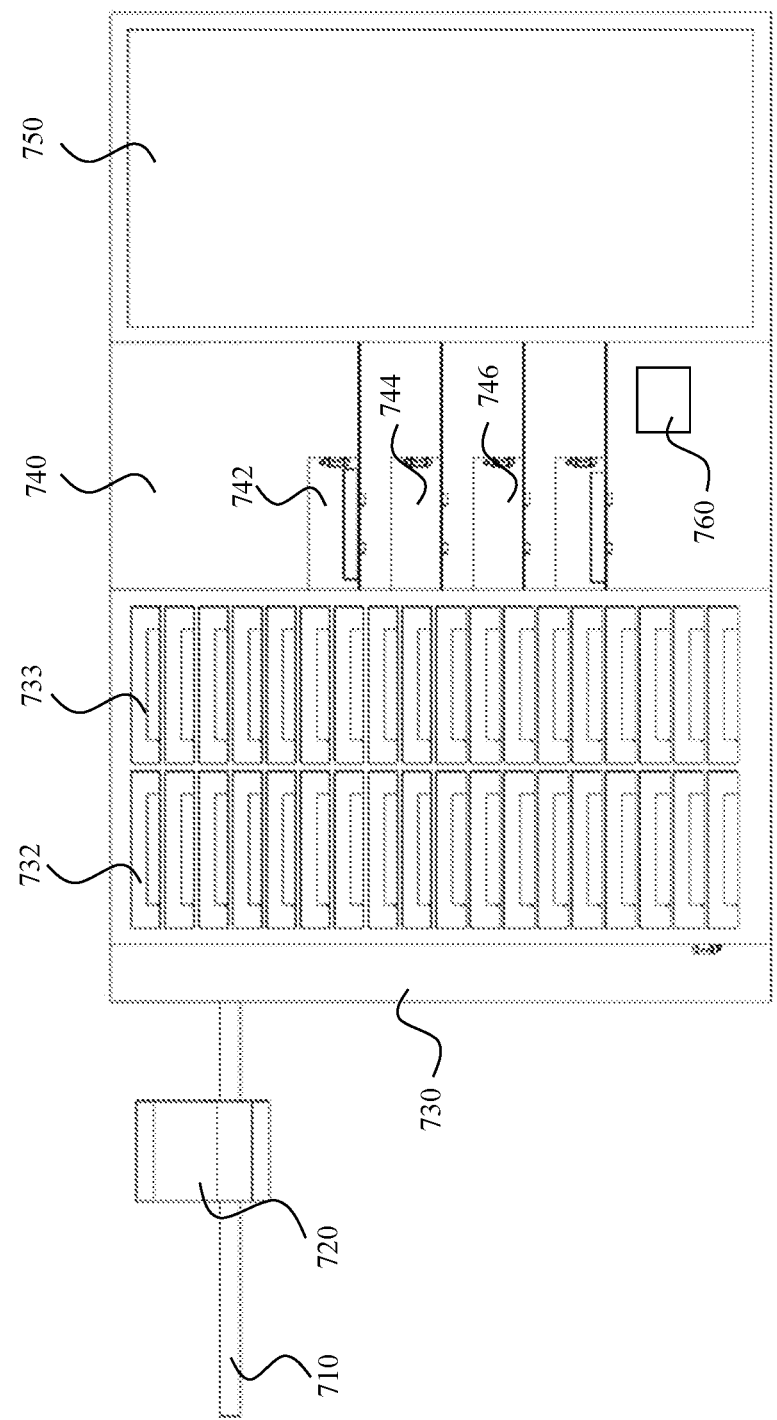
FIGS. 7A-7B show a collection area and compartments for handling a food product waiting to be collected, according to exemplary embodiments of the present invention.
Figure 7B:
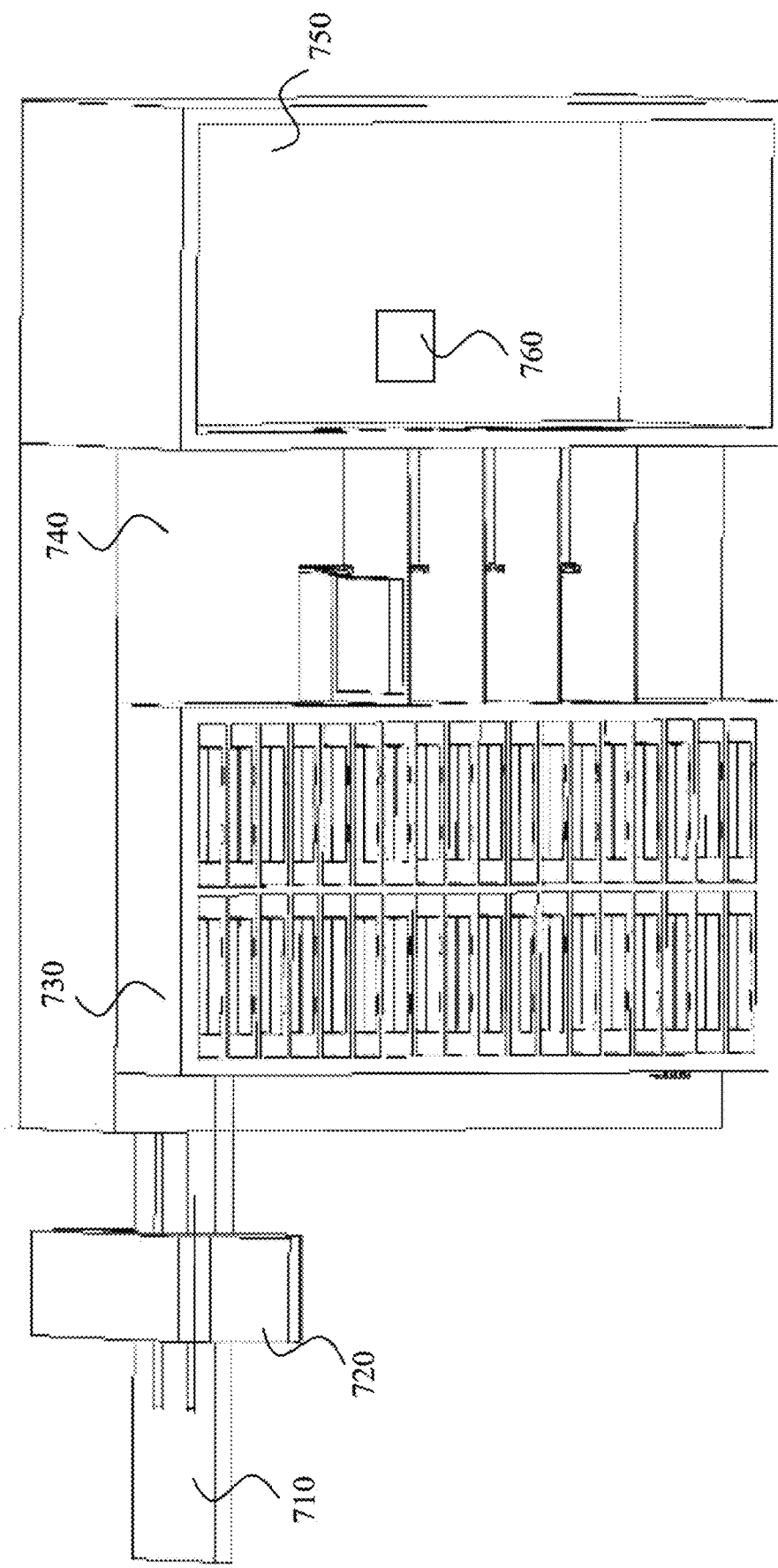

FIGS. 7A-7B show a collection area and compartments for handling a food product waiting to be collected, according to exemplary embodiments of the present invention.

The collection area may comprise a collection conveyor 710 on which the packed food products are placed to be conveyed to the collection compartments. The packed food products may be placed on the collection conveyor 710 by the packing arm. The length and velocity of the collection conveyor may be defined by the designer of the system. In some cases, the collection conveyor 710 may be coupled to a sensor that senses presence of a food product on the conveyor. A message from the conveyor may then activate the collection conveyor 710.

The collection area may also comprise a collection sensor 720 for detecting presence of materials in the packed food products. The collection sensor 720 may detect presence of metallic materials. The collection sensor 720 may be located adjacent to the collection conveyor 710.

From the collection conveyor 710, the packed food product may be conveyed to a heated area 730 or to a cold dish storage 750. The cold dish storage 750 may also store beverages loaded therein. The collection conveyor 710 may have a first stop in the heated area 730 and a second stop in the cold dish storage 750, and will convey the cooked food product to the correct stop based on a command from the computerized unit managing the delivery process. In some cases, the cold dish storage 750 and the heated area 730 may comprise a mechanism for pulling the cooked food product based on a command from the computerized unit, for example using a magnet or a robotic arm.

The heated area 730 is configured to keep the cooked dish warm, not to cook the food product. The heated area 730 may comprise heated compartments 732, 733. The computerized unit determines which food product is stored in each compartment in the heated area 730. In other cases, the cooked food products are placed in the compartments of the heated area 730 in a predefined order, and the computerized unit receives an indication as to which food product is located in each compartment of the heated area 730.

The collection area also comprises a collection section 740. In some cases, the collection section 740 is the only part of the collection area that is accessible from outside the housing. The collection section 740 comprises multiple collection compartments 742, 744, 746, from which a person can collect the order. The collection compartments 742, 744, 746 may be coupled to both the heated area 730 and to the cold dish storage 750, such that the hot food products are transferred to the specific collection compartment from the relevant compartment in the heated area 730, and the beverages and cold dishes are transferred to the specific collection compartment from the relevant compartment in the cold dish storage 750.

The collection compartments 742, 744, 746 may have a lock state and an unlock state. Switching from lock state and the unlock state may be performed in response to a command from an identifying module 760. Said switching may be implemented by moving an external window/door/wall preventing access to the collection compartments 742, 744, 746, or by enabling the person to move the window/door/wall. Enabling the person to move the lock may be done by moving a pin locking the lock, or by changing a voltage supplied by the system in case the lock is an electromagnetic lock.

The identifying module 760 may include an input unit outside the housing into which the person inputs a code. The identifying module 760 may also be a wireless transceiver that communicates with a mobile electronic device used by the person over a wireless channel, such as blue-tooth, near field communication, wi-Fi and the like, to receive information from the mobile electronic device in order to verify that the person is entitled to collect the food items in a specific collection compartment, or in multiple collection compartments.

Figure 8A:
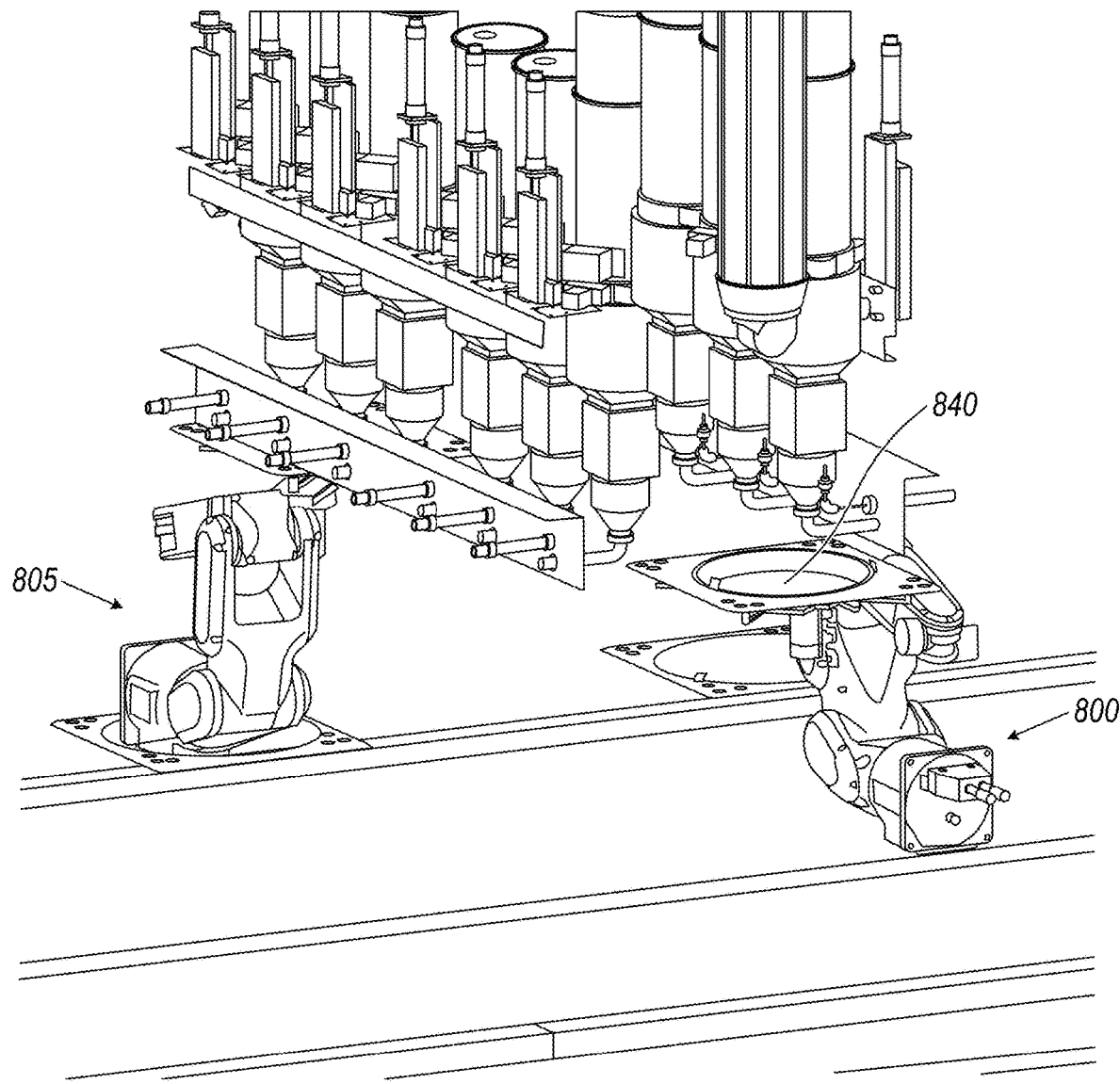
FIGS. 8A-8B schematically show robotic arms for moving the tray with the ingredients extracted from the cabinets and cartridges in the makeline area of the autonomous system, according to exemplary embodiments of the present invention.
Figure 8B:
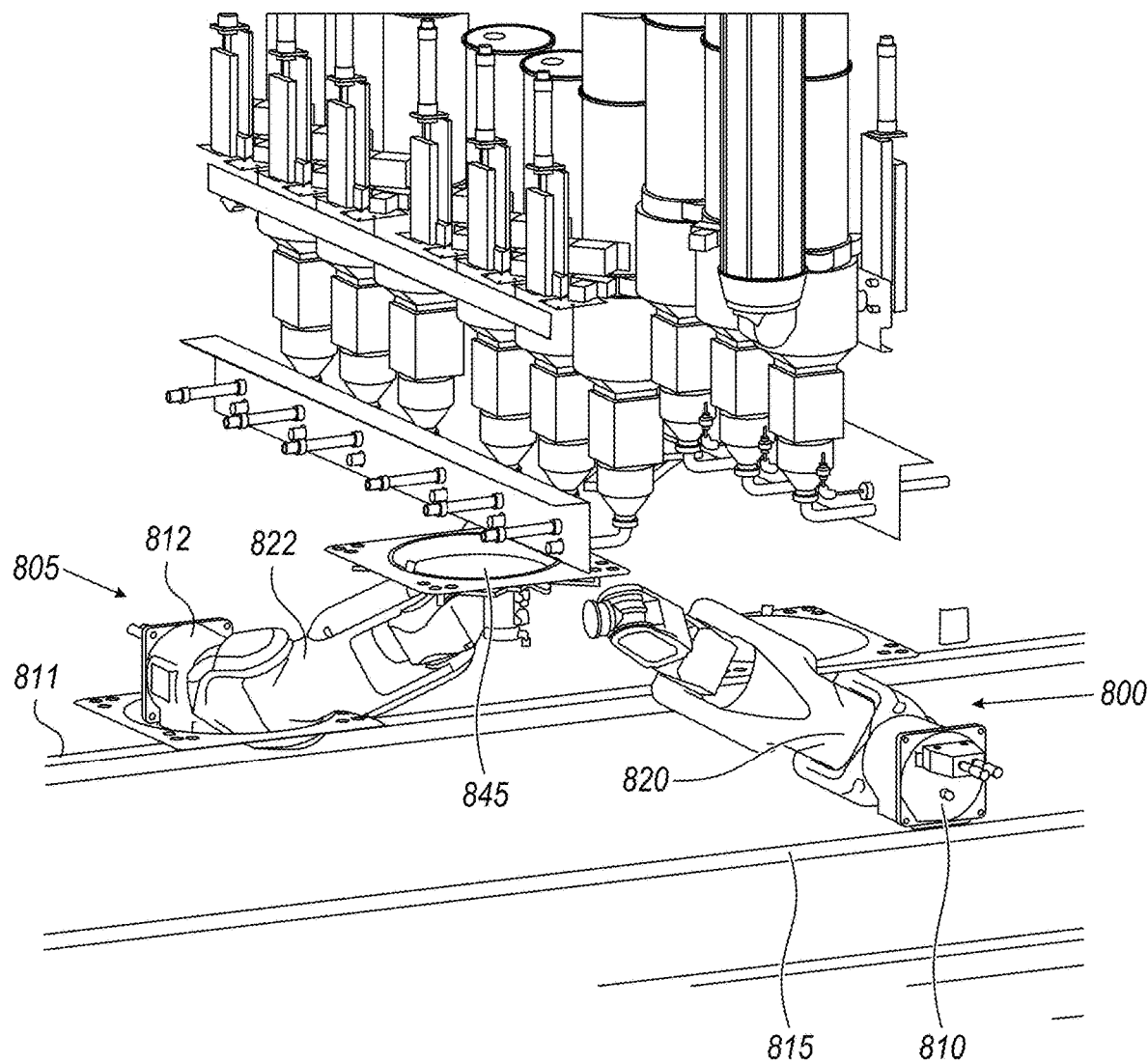

FIGS. 8A-8B schematically show robotic arms for moving the tray with the ingredients extracted from the cabinets and cartridges in the makeline area of the autonomous system, according to exemplary embodiments of the present invention. The arms may move the tray from under the cabinets, in which the extractor places the tray.

The number of robotic arms in the autonomous system may vary based on the technical and business requirements of the autonomous system. The robotic arm 800 comprises a base 810 sliding on a slider 815 protruding from the base 100 of the autonomous system. The base 810 may comprise a wheel or another mechanism moving with low friction relative to the slider 815. The robotic arm 800 also comprise a body 820 for carrying the ingredients. The body 820 may be maneuvered relative to the base 810 to enable the robotic arm to change the angle of placing the ingredients relative to the base 100 of the autonomous system.

In the embodiment disclosed herein, the autonomous system comprises two robotic arms 800 and 805. In FIG. 8A, robotic arm 800 carries a tray 840 and in FIG. 8B robotic arm 805 carries the tray 845. The tray 840 is coupled to the body 820 of the robotic arm 800. The body 820 may be long enough to enable placing the tray 840 under all the cartridges in the makeline area. Robotic arm 805 comprises a base 812 moving on slider 811, and body 822 for carrying the tray 840.

After all the ingredients are collected form the cartridges, the relevant robotic arm of the robotic arms 800 and 805 places the trays 840, 845 with the ingredients in a station from which the tray and the ingredients are moved to the cooking equipment, such as the oven, frying device, grill, mixer, wok, and the like.

Figure 9:
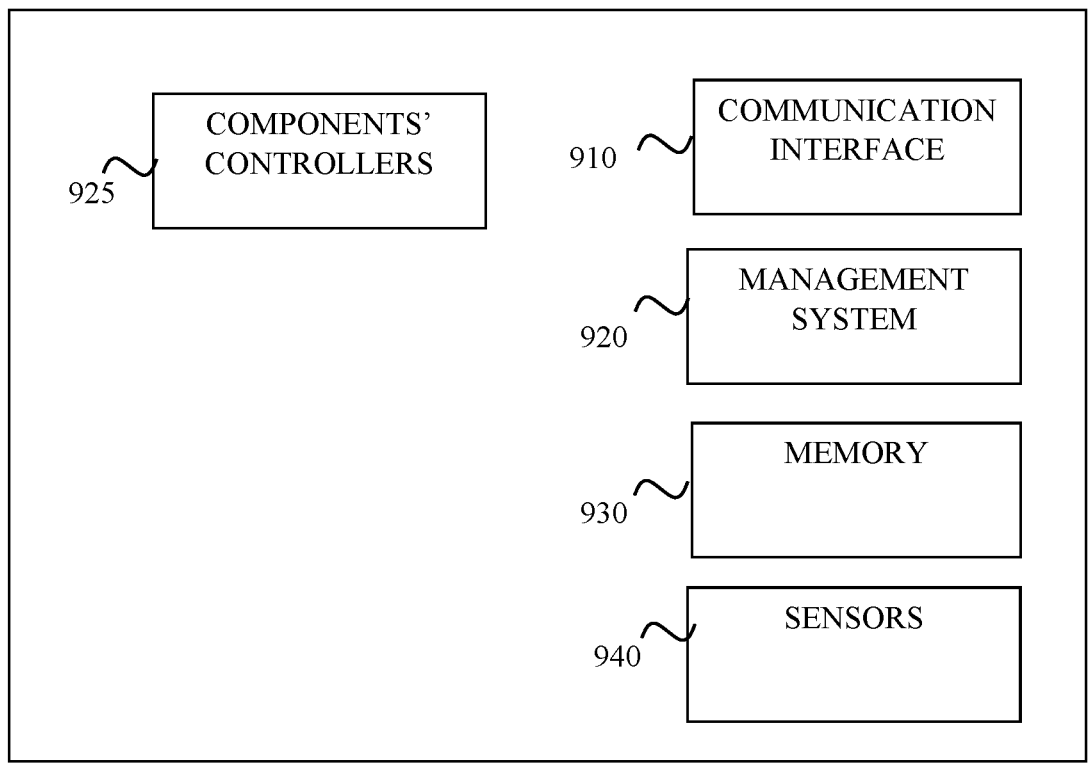
FIG. 9 schematically shows the computerized components of the autonomous system, according to exemplary embodiments of the present invention.

FIG. 9 schematically shows the computerized components of the autonomous system, according to exemplary embodiments of the present invention. The computerized unit of the autonomous system comprises a communication interface 910 for communicating with other devices or entities. The communication interface 910 may be coupled to the internet via a communication modem. The communication interface 910 may also obtain cellular connection, for example to receive and send SMS messages to cellular phones. The communication interface 910 may function as an order server receiving orders from customers, or receive orders from such online server.

The computerized unit of the autonomous system comprises a management system 920 that manages the operation of the autonomous system. The management system 920 sends commands to components' controllers 925 coupled to the components of the autonomous system. The components may be the arrays of ingredients tanks, the cooking equipment, the actuator, the conveyer belts, the packing arm, the robotic arms that move the tray under the cartridges, the sensors 940, and the like. The components' controllers 925 control the operation of these components, and are responsible to execute the commands received from the management system 920. The components' controllers 925 may convert the command form the management system 920 "bring cabinet #13" into "move the upper section of cabinets for 1.2 seconds", until the cabinet #13 is closest to the makeline area. The components' controllers 925 may be coupled to a local memory unit, or may have access to the rules stored in the memory 940. The management system 920 may also determine which of the cooking equipment to use, or which of the ingredients tanks to use, based on rules, such as load balancing, efficiency use of ingredients and the like.

The computerized unit of the autonomous system comprises a memory 930 for storing information related to the operation of the autonomous system. Such information may include a set of physical and mechanical operations required to prepare the food products prepared by the autonomous system. The memory 930 also stores the type of ingredients stored in the ingredients tanks, for example the cartridges and cabinets. The memory 930 also stores the orders received via the communication interface 910 and additional information as desired by a person skilled in the art.

The computerized unit of the autonomous system comprises sensors 940 for collecting information inside the autonomous system. For example, the sensors 940 may include a motion sensor for monitoring the movement of robotic arms or conveyors in the autonomous system. The motion sensor may send signals representing the actuator's movement to the management system 920. The sensors 940 may include image sensors for capturing images of food products and/or ingredients before and/or after preparation of the food products. The sensors 940 may include a sensor for detecting presence of materials in the system, such as an odor sensor, or a metal sensor for verifying that the prepared food products lack metallic materials. The sensors 940 may include an actuator sensor for detecting the actuator's movement and send signals representing the actuator's movement to the management system. The sensors 940 may include an inventory sensor for detecting inventory status of the multiple ingredients tanks.

The autonomous system may be part of a food chain. This way, the food chain may be managed on a cluster level, communicating with multiple autonomous systems, sending orders to a specific autonomous system. This way, the supply chain for multiple autonomous systems can be managed by a central system. The central system may receive reports from the multiple autonomous systems concerning production of orders, concerning inventory, concerning hazards, technical failures, and the like.

Figure 10:
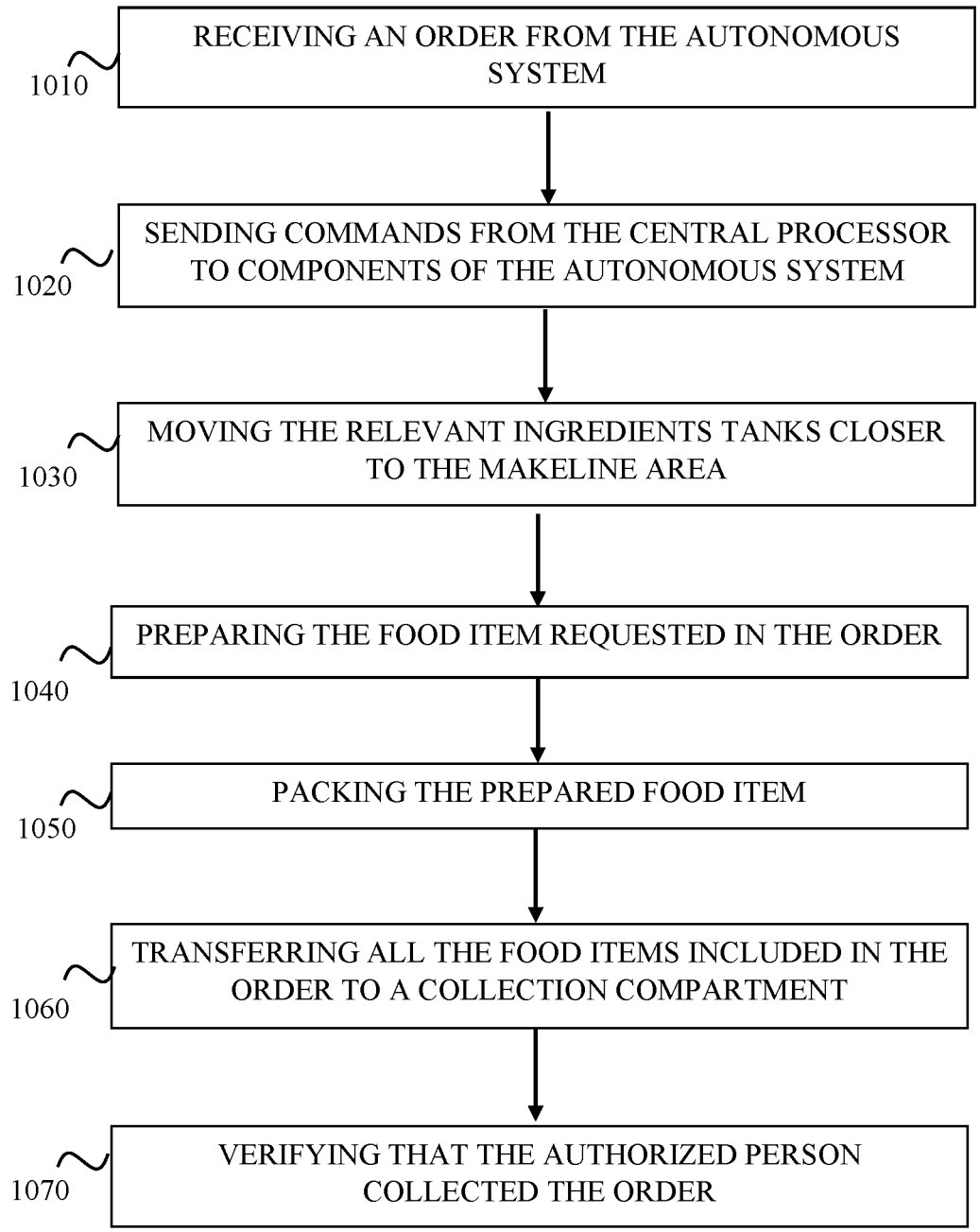
FIG. 10 shows a method for preparing a food item from an order in an autonomous manner, according to exemplary embodiments of the present invention.

FIG. 10 shows a method for preparing a food item from an order in an autonomous manner, according to exemplary embodiments of the present invention.

Step 1010 discloses receiving an order from the autonomous system. The order may be inputted by a customer of the autonomous system or a customer of a food chain operating the autonomous system. Examples of food chains may include McDonald's, Pizza Hut, Kentucky Fried Chicken, Taco Bell, Wingstreet, Sbarro, Panda express and the like. The autonomous system may communicate with a server operated by the food chain, such that the server determines which of multiple autonomous systems will prepare the order. The order comprises the food product to be prepared, and information related to the person collecting the order. The person may be the end client or the delivery person. The information may be the person's name or only an identifier which is inputted by the person when collecting the order.

Step 1020 discloses sending commands from the management system to components of the autonomous system. The commands may include the ingredients used to cook the food items in the received order. In some other cases, the commands may include an identifier in which the ingredients are located in the array of ingredients tanks in the system. For example, when the autonomous system is used for preparation of Pizza, the order may comprise the dough size, the dough type, toppings, sauces and the like. The autonomous system comprises a computerized unit having a memory that stores the ingredients and ingredients' types stored in each ingredients tank. Hence, when the pizza order requires a specific dough, the computerized unit sends an identifier of the ingredients tank storing the specific dough to a controller that controls the ingredients tanks.

Step 1030 discloses moving the relevant ingredients tanks closer to the makeline area. The relevant ingredients tanks are the ingredients tanks that contain the food product currently prepared by the autonomous system, either dispenses or cabinets. The ingredients tanks may be arranged in one or more arrays, each array is controlled separately by a controller. Each array comprises an actuator for moving specific ingredients tanks towards the makeline area when the ingredients in the specific ingredients tanks are required for preparation of the food product, and away from the makeline area, when other ingredients are required. The selection of which ingredients tanks to move away from the makeline area may be determined based on a popularity of an ingredient included in a ingredients tank. In some cases, multiple ingredients tanks may include the same ingredient, in case the ingredient is used more often.

Step 1040 discloses preparing the food item requested in the order. Preparation of the food item may be performed using a set of rules stored in the memory of the computing unit of the autonomous system. For example, in order to prepare pizza, first take a pizza dough from a cabinet that matches the specific pizza in the order, then bring the pizza dough closer to the topping cartridge, spread the sauce on the pizza dough, spread the toppings on the sauce, and move the pizza dough with the sauce and toppings to an oven. In another case, the order comprises a hamburger, and the rules for preparing comprise taking a raw piece of beef from a meat cabinet, place the beef on a grill for a predefined period of time, then extracting a bun from the bun cabinet, spreading sauces on the bun, placing the burger, adding vegetables and placing the top part of the bun on the vegetables. An order may include both a hamburger and French fries. In such a case, the management of the system's computerized unit may send commands to prepare the French fries from pieces of potatoes stored in the potato cartridge by moving the specific number of potatoes to the frying device. Then, the management system sends commands to move the burger and French fries to a packaging area.

Step 1050 discloses packing the prepared food item. The system will contain a stack of boxes, for example made of cardboard, paper, plastics and the like. The boxes may be stored in a flat or semi-flat position, requiring robotic arms to fold at least part of the box. Packing may be performed by placing the box on a packing station, placing the food item on top of the box and then folding the box around the food item.

Step 1060 discloses transferring all the food items included in the order to a collection compartment. The food items are transferred to the collection compartment after packaging. In some cases, the packaged food items are conveyed via one or more sensors, such as metal sensors, to verify that the packed food item lacks metallic materials. In some exemplary cases, multiple food items included in a single order are placed in a single collection compartment. For example, two burgers, one onion ring dish and two bottles of beverages.

Step 1070 discloses verifying that the authorized person collected the order. Verifying that the authorized person collected the order is done by receiving an identifier from the person, as elaborated below. The person may be a delivery person, the customer, or another person authorized by the customer to collect the order. The identifier used by the person may be stored at the memory of the computerized unit in the system and used for verification by the central server.

Figure 11:
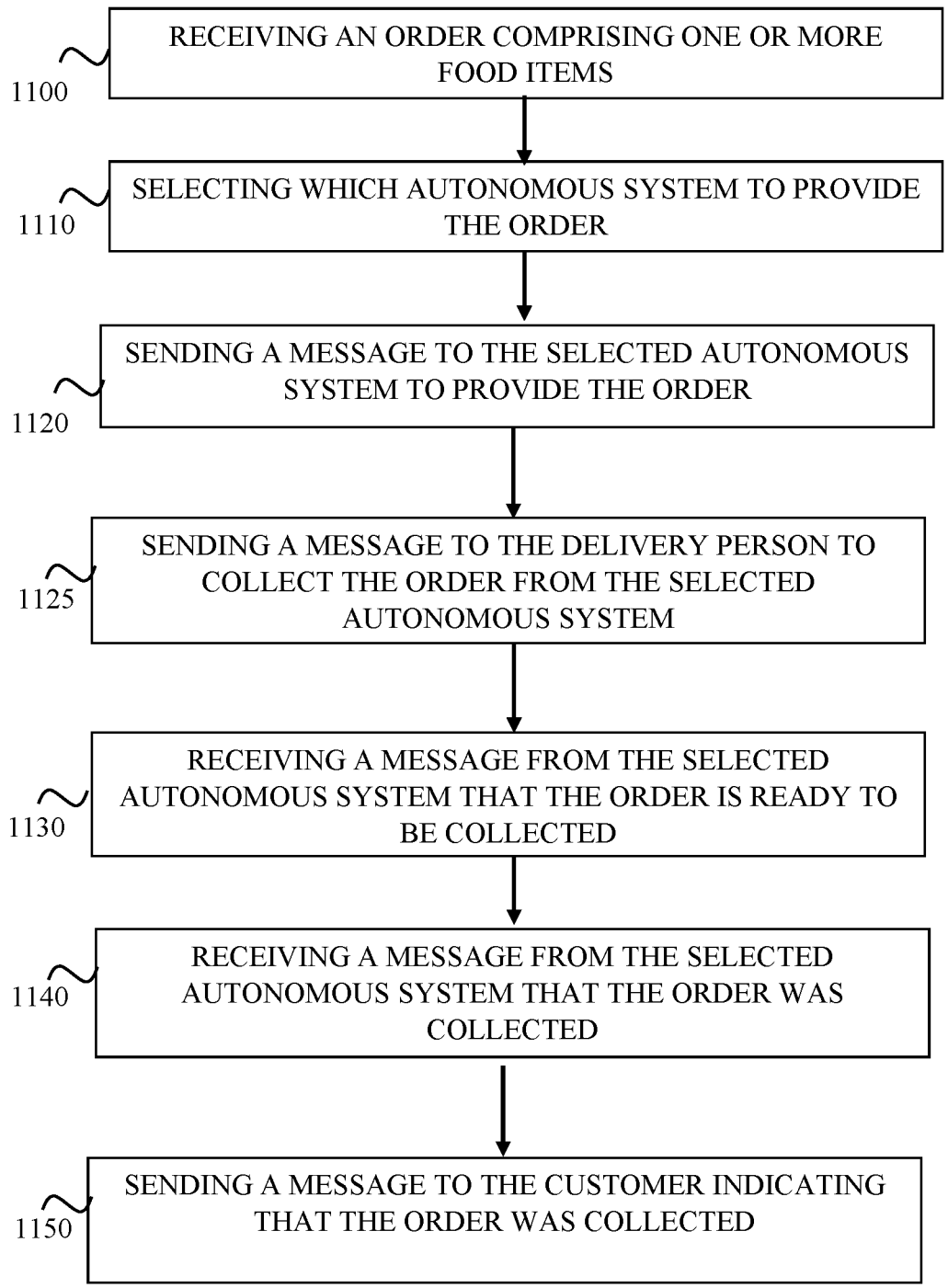
FIG. 11 shows a method for controlling a process for preparing a food item in an autonomous manner, according to exemplary embodiments of the present invention; and, FIG. 12 shows a method for verifying that a produced food item is provided to the authorized person, according to exemplary embodiments of the present invention.

FIG. 11 shows a method for controlling a process for preparing a food item in an autonomous manner, according to exemplary embodiments of the present invention. The process may be performed by a server communicating with multiple autonomous systems disclosed herein.

Step 1100 discloses receiving an order comprising one or more food items. The order may also include an identifier of the customer that inputted the order, and address at which the order is to be delivered. The customer's identifier may be associated with coupons, discounts or other benefits provided to the customer. The order may be associated with a time limit for delivery, for example 45 minutes from the time the order was issued into the server by the customer.

Step 1110 discloses selecting which autonomous system to provide the order. The server that received the order may communicate with multiple autonomous systems. The server may also communicate with computerized units in restaurants that also deliver cooked food items for deliveries. The server receives indications from the computerized units in the multiple autonomous systems as to the inventory status in each of the multiple autonomous systems. For example, whether one or more of the ingredients used to prepare the food items is missing in one of the multiple autonomous systems. In some cases, the server may not be able to select the autonomous system closest to the address of the order in case the specific autonomous system lacks one of the ingredients required to prepare the food product in the order. The server may also consider the load in the multiple autonomous systems, and other orders that should be collected from other autonomous systems.

Step 1120 discloses sending a message to the selected autonomous system to provide the order. The message may be sent over the internet, or over another communication channel or technique as desired by a person skilled in the art of communication and messaging. The message may include identifiers of the food product in the order, such as dishes' serial numbers, codes, names, or abbreviations. The order is then stored in an order queue in the computerized unit of the selected autonomous system.

Step 1125 discloses sending a message to the delivery person to collect the order from the selected autonomous system. The message may be sent over a cellular network to the delivery person's mobile electronic device, such as a cellular phone, tablet and the like. The message may be sent to an address defined by the delivery person, such as a phone number or email address. The message may include the list of items in the order. The message may include multiple orders to be collected from the same autonomous system. The message may include the time in which the delivery person is requested to collect the order, or the multiple orders.

Step 1130 discloses receiving a message from the selected autonomous system that the order is ready to be collected. The message may include a confirmation that all the food products in the order were prepared properly. The message may be prepared based on a predefined format, specifying the requirements that were satisfied when preparing the food items in the order, such as amount of ingredients, temperature of beverages in the refrigerator before transferred to the collection compartment, time elapsing between preparation of the food items and collecting the order and the like.

Step 1140 discloses receiving a message from the selected autonomous system that the order was collected. The message may include information concerning the person that collected the order, for example identifier of the delivery person, and the time in which the order was collected.

Step 1150 discloses sending a message to the customer indicating that the order was collected. The message may be sent to a phone number or email address that the customer inputted when ordered. The message may also include an estimates time of arrival of the order.

Figure 12:
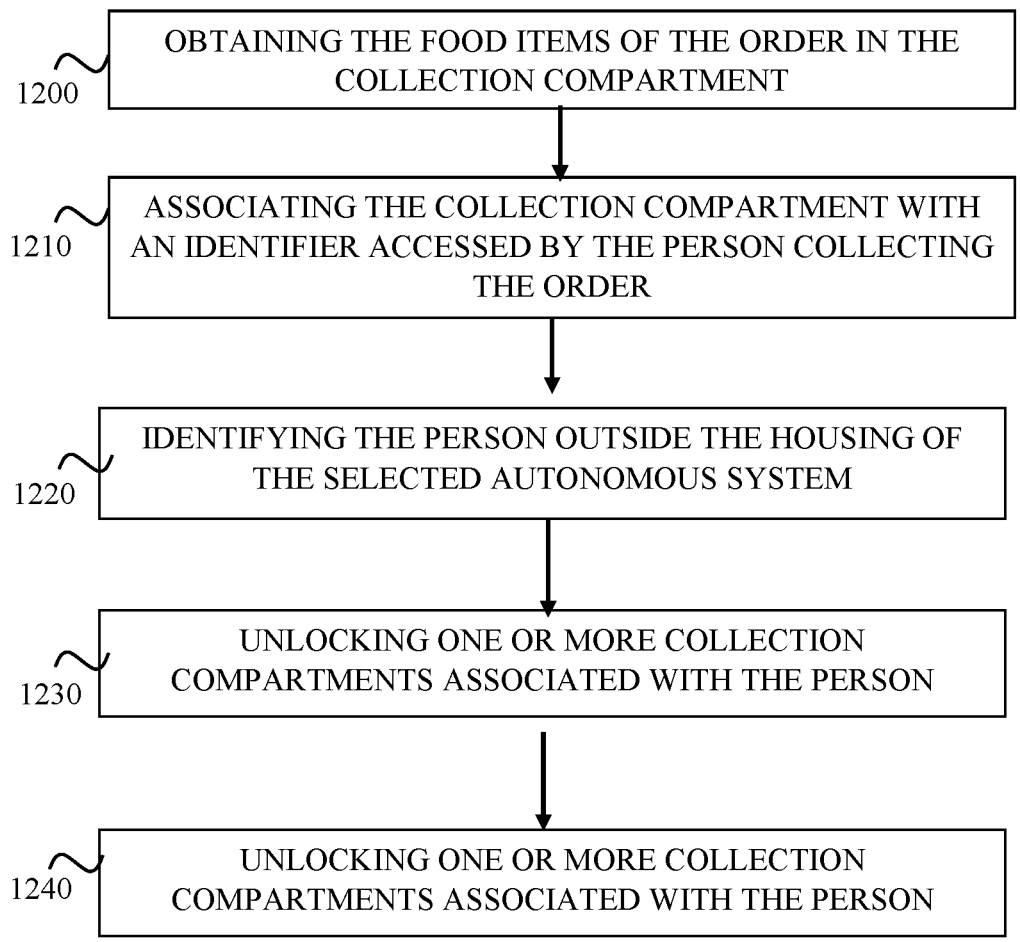

FIG. 12 shows a method for verifying that a produced food item is provided to the authorized person, according to exemplary embodiments of the present invention.

Step 1200 discloses obtaining the food items of the order in the collection compartment. Sensors located in the autonomous system, for example in the conveyor in which the packed food items are conveyed to the collection compartment, send an indication message to the central management system of the autonomous system that the food items in the order are located in the collection compartment. The message may also include an identifier of the collection compartment, for example compartment #3.

Step 1210 discloses associating the collection compartment with an identifier accessed by the person collecting the order. The order is managed by the management system of the autonomous system, from the process of receiving the order until the order is collected. In any given time, the management system obtains information as to the status of each of the food items of the order, either the food items are prepared, packed, or waiting for collection in a heated environment before transferred to the collection compartment. Each of the food items is associated with an order. As such, all the food items in a specific order are placed by the system in a specific collection compartment. The system also obtains an identifier of the order sent to the person collecting the order, such as a serial number of the order, or a code representing the order at the selected autonomous system. The identifier is used to verify that the person collecting the order collects the correct order, from the correct collection compartment.

Step 1220 discloses identifying the person outside the housing of the selected autonomous system. The identification may be implemented by inputting a code into a control panel located outside the housing of the selected autonomous system. The identification may be implemented by sending a message from the person's mobile electronic device to an address provided by the server, such as an SMS or another text message. The message may be compared to a message stored in a memory of the autonomous system, and if the message is correct, the collection compartment is unlocked and the person can collect the order. Other processes for identifying the person may be implemented as desired by a person skilled in the art.

Step 1230 discloses unlocking one or more collection compartments associated with the person. Unlocking is defined as enabling access to the goods located in the collection compartment. The unlocking may be implemented by moving a locking member, such as a pin, that locks a door of the collection compartment. The unlocking may be implemented by changing the electrical voltage of an electromagnet that locks the door of the collection compartment. Other ways to unlock the collection compartment may be selected by the person skilled in the art.

In some exemplary cases, the autonomous system approves the delivery person to travel to his/her destination only after verifying that all the food products associated with orders to be delivered by the same delivering person are collected by the delivering person. For example, the same delivery person may be responsible to deliver 3 different orders, while only 2 orders are ready in the collection compartments of the system. In such a case, the delivery person may be required to wait near the system until the food products of the third order are ready in the collection compartment. In some cases, the autonomous system sends the destinations of the orders only after verifying that the collection compartments that stored the food products of the orders are empty. Verifying emptiness of the collection compartments may be done using weight sensors, cameras, and the like. The destination may be sent by the system's communication interface 910, directly to the delivery person's mobile electronic device or from the system's communication interface 910, to a remote device such as the delivery server, which sends the addresses to the delivery person's mobile electronic device, such as a mobile phone, tablet, and the like.

Step 1240 discloses sending a message to the central system that order was collected. The message may include the time in which the order was collected. The message may include an identifier of the person that collected the order. The person's identifier may be used later, in case the order was not properly delivered.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. An autonomous system for preparing food products located in a housing, the system comprising:
   multiple ingredients tanks for storing ingredients of food products;
   cooking equipment located in a makeline area located near the multiple ingredients tanks, wherein the food products are prepared by the cooking equipment using the ingredients stored in the multiple ingredients tanks, said cooking equipment are coupled to electrical circuitry for controlling the operation of the cooking equipment;
   a computerized unit, comprising:
   a communication interface for collecting orders for the food products;
   memory for storing operations for preparing the food products included in the orders from the ingredients;
   a management system for sending commands to the cooking equipment to prepare the food products included in the orders;
   a delivery preparation system for preparing the prepared food product for delivery;
   one or more collection compartments for storing the prepared food products included in the orders after the prepared food products are prepared for delivery by the delivery preparation system;
   wherein each of the collection compartments comprise an identifier accessed from outside the housing;
   wherein each of the collection compartments stores the prepared food products included in the orders associated with a person collecting the orders;
   wherein the communication interface sends details of the order only after the collection compartments that stored the prepared food products of the order collected by the person are empty.

2. The system of claim 1, wherein the communication interface receives an identifier identifying the orders received from a delivery server, wherein the identifier is used to verify that an authorized person collects the prepared food products.

3. The system of claim 1, wherein each of the one or more collection compartments has a lock state and an unlock state, wherein the collection compartments move to unlock state upon identifying an authorized person collecting the prepared food products.

4. The system of claim 3, further comprises an identifying module coupled to the one or more collection compartments, the identifying module receives a signal to identify the authorized person collecting the prepared food items from the collection compartments.

5. The system of claim 1, wherein the delivery preparation system comprises:
   a packing arm coupled to the management system, said packing arm is configured to pack the prepared food products;
   a stack of boxes from which the packing arm extracts a box to pack the prepared food products.

6. The system of claim 5, further comprises a conveyor for conveying the packed food products from the packing arm to the collection compartments.

7. The system of claim 1, further comprising an actuator sensor for detecting the actuator's movement and send signals representing the actuator's movement to the management system.

8. The system of claim 1, further comprising an actuator for moving at least one ingredients tank from the multiple ingredients tanks towards the makeline area.

9. The system of claim 8, wherein the cooking equipment comprises multiple cooking equipment in the makeline area, the management system determines which food product is prepared by each cooking equipment of the multiple cooking equipment, wherein the actuator moves a ingredients tank storing the ingredients required to prepare the food product in the received order to the cooking equipment selected by the management system.

10. The system of claim 1, wherein the housing comprises a loading area, said loading area comprising a loading aperture used to load tanks filled with ingredients into the system.

11. The system of claim 1, wherein the management system receives an indication when ingredients are loaded into the ingredients tanks, said indication comprises an identifier of the ingredient and an identifier of the ingredients tank.

12. The system of claim 1, wherein at least one of the multiple ingredients tanks move towards the cooking equipment in response to a command from the management system.

13. The system of claim 1, wherein the multiple ingredients tanks are arranged in two separate arrays of ingredients tanks, wherein the first array of ingredients tanks comprise cabinets storing ingredients required to be extracted by entering the cabinets, and wherein the second array of ingredients tanks comprises cartridges.

14. The system of claim 13, wherein the first array of ingredients tanks comprises an upper section of cabinets and a lower section of cabinets, each of the upper section of cabinets and a lower section of cabinets move independent relative to the other section.

15. The system of claim 13, further comprising:
   a makeline bar for carrying cartridges of the second array of ingredients tanks used to prepare the food products of the order;
   a waiting bar for carrying cartridges of the second array of ingredients tanks not used to prepare the food products of the order.

16. The system of claim 15, wherein moving cartridges from the waiting bar to the makeline bar based on the ingredients needed to prepare the food products of the order.

17. The system of claim 15, wherein moving a cartridge from the waiting bar to the makeline bar while other cartridges dispense ingredients to prepare the food products of the order.

18. The system of claim 1, wherein the components' controllers generate commands sent to the multiple ingredients tanks and to the cooking equipment in response to a new order received at the management system prior to receiving commands from the management module.

19. An autonomous system for preparing food products located in a housing, the system comprising:
- multiple ingredients tanks for storing ingredients of food products;
- cooking equipment located in a makeline area located near the multiple ingredients tanks, wherein the food products are prepared by the cooking equipment using the ingredients stored in the multiple ingredients tanks, said cooking equipment are coupled to electrical circuitry for controlling the operation of the cooking equipment;
- a computerized unit, comprising:
- a communication interface for collecting orders for the food products;
- memory for storing operations for preparing the food products included in the orders from the ingredients;
- a management system for sending commands to the cooking equipment to prepare the food products included in the orders;
- a delivery preparation system for preparing the prepared food product for delivery;
- one or more collection compartments for storing the prepared food products included in the orders after the prepared food products are prepared for delivery by the delivery preparation system;
- wherein each of the collection compartments comprise an identifier accessed from outside the housing;
- wherein each of the collection compartments stores the prepared food products included in the orders associated with a person collecting the orders;
- an inventory sensor for detecting inventory status of the multiple ingredients tanks.

20. An autonomous system for preparing food products located in a housing, the system comprising:
- multiple ingredients tanks for storing ingredients of food products;
- cooking equipment located in a makeline area located near the multiple ingredients tanks, wherein the food products are prepared by the cooking equipment using the ingredients stored in the multiple ingredients tanks, said cooking equipment are coupled to electrical circuitry for controlling the operation of the cooking equipment;
- a computerized unit, comprising:
- a communication interface for collecting orders for the food products;
- memory for storing operations for preparing the food products included in the orders from the ingredients;
- a management system for sending commands to the cooking equipment to prepare the food products included in the orders;
- a delivery preparation system for preparing the prepared food product for delivery;
- one or more collection compartments for storing the prepared food products included in the orders after the prepared food products are prepared for delivery by the delivery preparation system;
- wherein each of the collection compartments comprise an identifier accessed from outside the housing;
- wherein each of the collection compartments stores the prepared food products included in the orders associated with a person collecting the orders;
- a cold dish storage for storing beverages and cold dishes, said cold dish storage is coupled to the collection compartment, such that the beverages and cold dishes move from the cold dish storage to the collection compartment based on the received order.

* * * * *